United States Patent
Moll et al.

(10) Patent No.: US 7,516,274 B2
(45) Date of Patent: Apr. 7, 2009

(54) POWER CONSERVATION VIA DRAM ACCESS REDUCTION

(75) Inventors: Laurent R. Moll, San Jose, CA (US); Seungyoon Peter Song, East Palo Alto, CA (US); Peter N. Glaskowsky, Cupertino, CA (US); Yu Qing Cheng, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 219 days.

(21) Appl. No.: 11/351,070

(22) Filed: Feb. 9, 2006

(65) Prior Publication Data

US 2007/0113015 A1    May 17, 2007

Related U.S. Application Data

(60) Provisional application No. 60/736,632, filed on Nov. 15, 2005, provisional application No. 60/736,736, filed on Nov. 15, 2005, provisional application No. 60/761,220, filed on Jan. 23, 2006.

(51) Int. Cl.
    *G06F 13/00* (2006.01)
(52) U.S. Cl. .................. 711/118; 711/135; 710/14
(58) Field of Classification Search ............... 711/118, 711/135; 710/14
    See application file for complete search history.

(56) References Cited

U.S. PATENT DOCUMENTS 5,559,952 A  *  9/1996  Fujimoto .................... 345/557
7,266,641 B2 *  9/2007  Kamei et al. ................ 711/118
2005/0005073 A1 * 1/2005  Pruvost et al. .............. 711/148
2005/0044448 A1 * 2/2005  Verdun ........................ 714/22

OTHER PUBLICATIONS

Jim Handy, The Cache Memory Book 1998, Academic Press, Inc., Second Edition, pp. 86-87.*
Roman Mostinski and David Yoder, 2D/3D Graphics Support in the i.MX31 and i.MX31L Multimedia Applications Processors, Jun. 2005, Freescale Semiconductor, Inc., Rev. 0.0, pp. 1-12.*
David A. Patterson and John L. Hennessy, Computer Organization and Design, 1998, Morgan Kaufmann Publishers, Inc., Second Edition, pp. 19 and B-31.*

(Continued)

*Primary Examiner*—Kevin L Ellis
*Assistant Examiner*—Jared I Rutz
(74) *Attorney, Agent, or Firm*—Osha • Liang LLP

(57) ABSTRACT

Power conservation via DRAM access reduction is provided by a buffer/mini-cache selectively operable in a normal mode and a buffer mode. In the buffer mode, entered when CPUs begin operating in low-power states, non-cacheable accesses (such as generated by a DMA device) matching specified physical address ranges are processed by the buffer/mini-cache, instead of by a memory controller and DRAM. The buffer/mini-cache processing includes allocating lines when references miss, and returning cached data from the buffer/mini-cache when references hit. Lines are replaced in the buffer/mini-cache according to one of a plurality of replacement policies, including ceasing replacement when there are no available free lines. In the normal mode, entered when CPUs begin operating in high-power states, the buffer/mini-cache operates akin to a conventional cache and non-cacheable accesses are not processed therein. In one usage scenario, data retained in the buffer/mini-cache is graphics refresh data maintained in a compressed format.

25 Claims, 12 Drawing Sheets

OTHER PUBLICATIONS

Heidi Pan and Krste Asanovic, Heads and Tails: A Variable-Length Instruction Format Supporting Parallel Fetch and Decode, Nov. 2001, ACM, pp. 1-8.*

Handy, Jim, The Cache Memory Book, 1998, Academic Press, Inc., Second Edition, pp. 2-5 and 80-85.*

* cited by examiner

POWER CONSERVATION VIA DRAM ACCESS REDUCTION

CROSS REFERENCE TO RELATED APPLICATIONS

Priority benefit claims for this application are made in the accompanying Application Data Sheet (if any). To the extent permitted by the type of the instant application, this application incorporates by reference for all purposes the following applications, which are all owned by the owner of the instant application:

U.S. Provisional Application Ser. No. 60/736,632 filed Nov. 14, 2005, by Laurent R. Moll, et al., and entitled POWER CONSERVATION VIA DRAM ACCESS REDUCTION;

U.S. Provisional Application Ser. No. 60/736,736 filed Nov. 15, 2005, by Laurent R. Moll, et al., and entitled A SMALL AND POWER-EFFICIENT CACHE THAT CAN PROVIDE DATA FOR BACKGROUND DMA DEVICES WHILE THE PROCESSOR IS IN A LOW-POWER STATE; and U.S. Provisional Application Ser. No. 60/761,220 filed Jan. 23, 2006, by Laurent R. Moll, et al., and entitled POWER CONSERVATION VIA DRAM ACCESS REDUCTION.

BACKGROUND

1. Field

Advancements in microprocessor system DRAM accessing and microprocessor system DMA processing are needed to provide improvements in performance, power efficiency, and utility of use.

2. Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes. Nothing herein is to be construed as an admission that any of the references are pertinent prior art, nor does it constitute any admission as to the contents or date of actual publication of these documents.

In some microprocessor systems DRAM accesses are performed during DMA operations (such as GPU references to frame buffer information) when other processing in the system is minimal or suspended, and each of the DRAM accesses consumes significant power. Similarly, in some microprocessor systems all or portions of an otherwise powered-down processor and associated cache sub-system are powered up (or are prevented from powering down) to process coherent DMA operations (such as a USB device transaction). What are needed are more effective techniques of performing DRAM accesses and processing DMA accesses, thereby enabling improvements in performance, power efficiency, and utility of use.

In ACPI-compliant systems, coherent DMA is disallowed for low-power ACPI-compliant states C3, C4, C5, and so forth, as there is no snooping, while coherent DMA is allowed for relatively higher-power ACPI-compliant states C2, C1, and C0, as caches are snooped. Hereinafter the terms C0, C1, C2, C3, C4, and C5 are meant to refer to like-named ACPI-compliant power states.

SUMMARY

The invention may be implemented in numerous ways, including as a process, an article of manufacture, an apparatus, a system, a composition of matter, and a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. The Introduction includes Illustrative Combinations that tersely summarize illustrative systems and methods in accordance with the concepts taught herein. As is discussed in more detail in the Conclusions, the invention encompasses all possible modifications and variations within the scope of the issued claims, which are appended to the very end of the issued patent.

DETAILED DESCRIPTION

Figure 1:
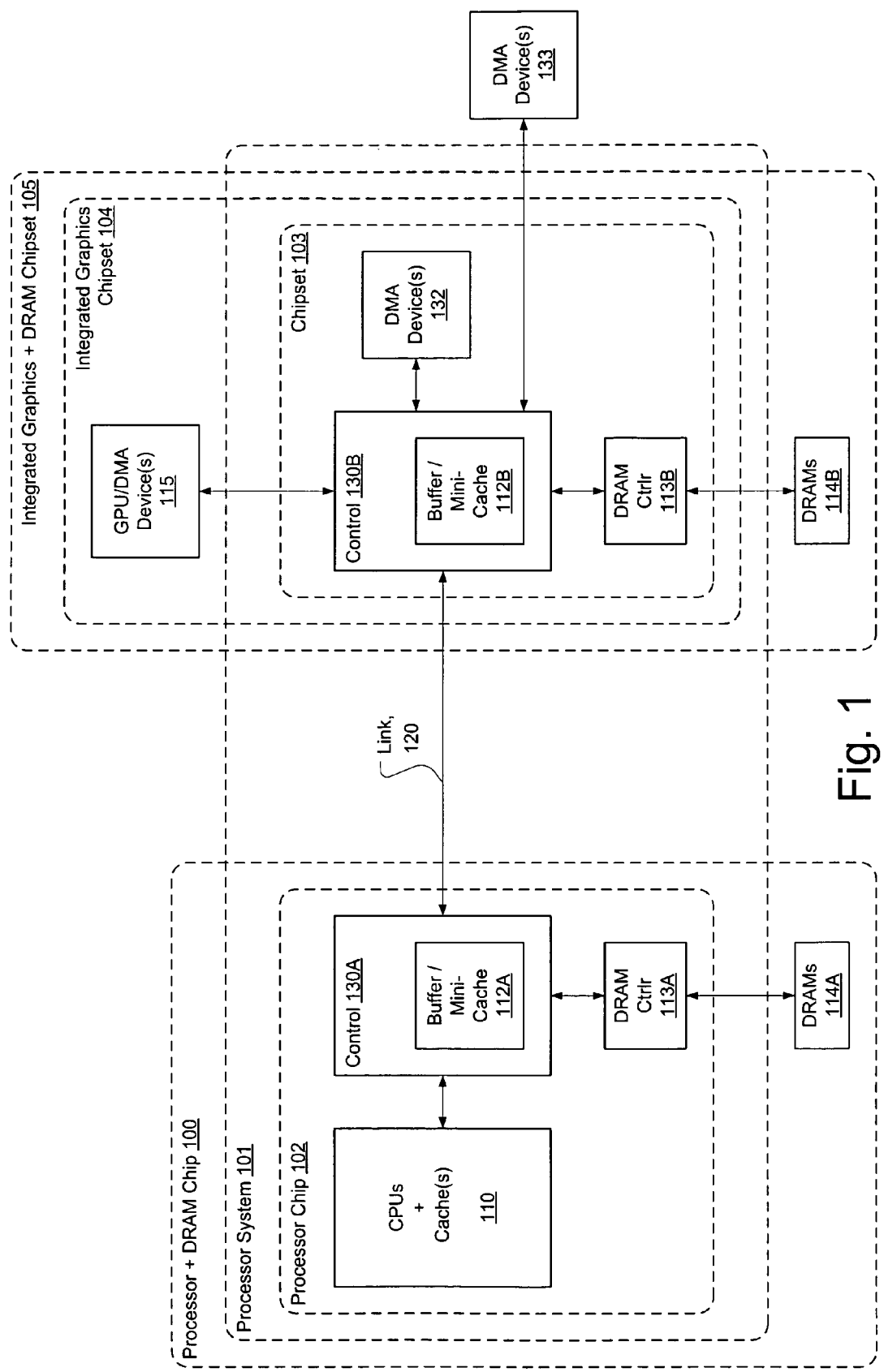
FIG. 1 illustrates selected details of several embodiments of a system that implements transparent use of one or more buffer/mini-caches for satisfying selected non-cacheable accesses and for satisfying some background DMA device accesses.

A detailed description of one or more embodiments of the invention is provided below along with accompanying figures that illustrate the principles of the invention. Some of the embodiments or variations thereof may be characterized as "notable." The invention is described in connection with the embodiments, which are understood to be merely illustrative and not limiting. The invention is expressly not limited to or by any or all of the embodiments herein (notable or otherwise). The scope of the invention is limited only by the claims appended to the end of the issued patent and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Introduction

This introduction is included only to facilitate the more rapid understanding of the Detailed Description. The invention is not limited to the concepts presented in the introduction, as the paragraphs of any introduction are necessarily an abridged view of the entire subject and are not meant to be an exhaustive or restrictive description. For example, the introduction that follows provides overview information limited by space and organization to only certain embodiments. There are in fact many other embodiments, including those to which claims will ultimately be drawn, which are discussed throughout the balance of the specification.

Acronyms

Elsewhere herein various shorthand abbreviations, or acronyms, are used to refer to certain elements. The descriptions of the acronyms follow.

| Acronym | Description |
| --- | --- |
| ACPI | Advanced Configuration and Power Interface |
| CPU | Central Processing Unit |
| CRT | Cathode Ray Tube |
| DMA | Direct Memory Access |
| DRAM | Dynamic Random Access (read/write) Memory |
| FIFO | First In First Out |
| GPU | Graphics Processing Unit |
| I/O | Input/Output |
| L1 | First level cache |
| L2 | Second level cache |
| L3 | Third level cache |
| LRU | Least Recently Used |
| MRU | Most Recently Used |
| MSR | Machine/model Specific Register |
| OS | Operating System |
| PC | Personal Computer |
| PDA | Personal Digital Assistant |
| USB | Universal Serial Bus |

Transparent use of an internal small and power-efficient buffer/mini-cache in a processor system enables a reduction in power consumption by eliminating some DRAM accesses via satisfying selected non-cacheable accesses with the buffer/mini-cache. The buffer/mini-cache enables a further reduction in power consumption by reducing occurrences when a CPU or a cache sub-system of a microprocessor system must be powered-up via satisfying some background DMA device accesses with the buffer/mini-cache. In some embodiments the microprocessor system implements a plurality of processors (or CPUs), each having associated cache sub-systems (such as various arrangements of first-, second-, third-, and higher-level caches).

Power savings via DRAM access reduction is provided by the buffer/mini-cache being selectively operable in a normal mode and a buffer mode. In the buffer mode, entered when CPUs begin operating in low-power states, non-cacheable accesses (such as generated by a DMA device) matching specified physical address ranges are processed by the buffer/mini-cache, instead of by a memory controller and DRAM. The buffer/mini-cache processing includes allocating lines when references miss, and returning cached data from the buffer/mini-cache when references hit. Lines are replaced in the buffer/mini-cache according to one of a plurality of replacement policies, including ceasing replacement when there are no available free lines. In the normal mode, entered when CPUs begin operating in high-power states, the buffer/mini-cache operates akin to a conventional cache and non-cacheable accesses are not processed therein. In one usage scenario, data retained in the buffer/mini-cache is graphics refresh data maintained in a compressed format.

In some implementations, the buffer/mini-cache is a portion of a cache (such as any of a first-, second-, or third-level cache) coupled to one or more CPUs. In some implementations, the buffer/mini-cache is a portion of a highest-level cache (or "outer-level" cache) in a cache sub-system coupled to one or more CPUs. For example, in a cache sub-system having only first-level cache(s), the buffer/mini-cache may be a portion of the first-level cache (or optionally caches, if there are more than one). For another example, in a cache sub-system having first- and second-level caches, the buffer/mini-cache may be a portion of the second-level cache (or optionally caches, if there are more than one second-level caches). For another example, in a cache sub-system having first-, second-, and third-level cache(s), the buffer/mini-cache may be a portion of the third-level cache (or caches, if there are more than one third-level caches).

Power savings via CPU and/or cache sub-system power-up reduction is provided by the buffer/mini-cache sourcing and sinking selected DMA accesses directed to a memory space included in a coherency domain of a CPU, when cached data in the CPU is inaccessible due to any or all of the CPU (or an associated microprocessor system) being in a low-power state not supporting snooping. Satisfying the selected DMA accesses via the buffer/mini-cache enables reduced power consumption by allowing the microprocessor system (or portion thereof) to remain in the low-power state. The buffer/mini-cache may be operated in a (temporarily) incoherently fashion with respect to the cached data in the microprocessor system and flushed before deactivation to synchronize with the cached data when the microprocessor (or portion thereof) transitions to a high-power state that enables snooping. Alternatively the buffer/mini-cache may be operated in an (incrementally) coherent fashion with respect to the cached data.

The buffer/mini-cache may be managed as a direct, fully associative, or set associative storage, with allocation policies including LRU, MRU, or variations thereof. The allocation policies may include ceasing allocation when free lines are no longer available in the buffer/mini-cache. Allocation state (such as LRU or MRU state) may advance independently of or dependent on power-state of the microprocessor system (or selected elements therein).

The buffer/mini-cache may be directed to process all DMA transactions, or to select DMA transactions for processing based on transaction address range(s), or which DMA device is originating a transaction. The buffer/mini-cache may selectively process DMA transactions only when the microprocessor system (or portion thereof) is operating in a low-power or snooping-disable state. The buffer/mini-cache may process DMA transactions when the microprocessor system (or elements therein) is operating in a high-power or snooping-enabled state.

Data may be stored (or "pre-filled") in the buffer/mini-cache (in expectation of use by future DMA references) before cached data in the microprocessor becomes unavailable when the microprocessor transitions to non-snooping operation. The pre-filling may be according to programmed address range(s) or dynamically according to previously observed DMA transactions.

Illustrative Combinations

This introduction concludes with a collection of paragraphs that tersely summarize illustrative systems and methods in accordance with the concepts taught herein. Each of the paragraphs highlights various combinations of features using an informal pseudo-claim format. These compressed descriptions are not meant to be mutually exclusive, exhaustive, or restrictive and the invention is not limited to these highlighted combinations. As is discussed in more detail in the Conclusion section, the invention encompasses all possible modifications and variations within the scope of the issued claims, which are appended to the very end of the patent.

This introduction concludes with a collection of paragraphs that tersely summarize illustrative systems and methods in accordance with the concepts taught herein. Each of the paragraphs highlights various combinations of features using an informal pseudo-claim format. These compressed descriptions are not meant to be mutually exclusive, exhaustive, or restrictive and the invention is not limited to these highlighted combinations. As is discussed in more detail in the Conclusion section, the invention encompasses all possible modifications and variations within the scope of the issued claims, which are appended to the very end of the patent.

A first illustrative combination of a system including a storage array operable according to a cacheable-access mode and a non-cacheable access mode; and a storage array controller to control the storage array, the storage array controller designed to recognize an event and in response transition the storage array from the cacheable-access mode to the non-cacheable access mode. The first illustrative combination wherein the event is a first event and the storage array controller is further designed to recognize a second event and in response transition the storage array from the non-cacheable access mode to the cacheable access mode. The aforementioned illustrative combination wherein the first event includes any of an instruction processor switching to a lower power state, the instruction processor switching to a lower performance state, the instruction processor turning off snooping, programming of mode information to disable the cacheable-access mode, and programming of the mode information to enable the non-cacheable-access mode. The aforementioned illustrative combination wherein the second event includes any of the instruction processor switching to a higher power state, the instruction processor switching to a higher performance state, the instruction processor turning on snooping, programming the mode information to enable the cacheable-access mode, and programming the mode information to disable the non-cacheable-access mode.

A second illustrative combination of a system including a storage array operable according to a cacheable-access mode and a non-cacheable access mode; and a state machine to control the storage array, the state machine designed to receive notification of an event and in response transition operation of the storage array from the non-cacheable-access mode to the cacheable access mode. The second illustrative combination wherein the event is a first event and the state machine is further designed to receive notification of a second event and in response transition the operation of the storage array from the cacheable access mode to the non-cacheable access mode. The aforementioned illustrative combination wherein the first event includes any of an instruction processor switching to a higher power state, the instruction processor switching to a higher performance state, the instruction processor enabling snooping, programming mode information to enable the cacheable-access mode, and programming the mode information to disable the non-cacheable-access mode. The aforementioned illustrative combination wherein the second event includes any of the instruction processor switching to a lower power state, the instruction processor switching to a lower performance state, the instruction processor disabling snooping, programming the mode information to disable the cacheable-access mode, and programming the mode information to enable the non-cacheable-access mode.

Any of the first and the second illustrative combinations wherein the storage array operates as a cache responsive to cacheable accesses when operated according to the cacheable-access mode. Any of the first and the second illustrative combinations wherein the storage array operates as a cache responsive to non-cacheable accesses when operated according to the non-cacheable-access mode.

Any of the first and the second illustrative combinations further including an outer-level cache including the storage array. The aforementioned illustrative combination wherein the outer-level cache is at least one of a first-level cache, a second-level cache, and a third-level cache. The aforementioned illustrative combination further including a microprocessor including the outer-level cache. The aforementioned illustrative combination further including a memory controller included in the microprocessor. The aforementioned illustrative combination further including memory devices accessible via the memory controller.

Any of the first and the second illustrative combinations further including a display processor. The aforementioned illustrative combination wherein the display processor generates non-cacheable accesses that at least a portion of result in allocation of entries in the storage array when the storage array is operating in the non-cacheable access mode. The aforementioned illustrative combination wherein the display processor generates further non-cacheable accesses that at least a portion of result in reading some of the allocated entries in the storage array when the storage array is operating in the non-cacheable access mode.

Any of the first and the second illustrative combinations wherein the storage array is flushed as part of the transition from the cacheable-access mode. Any of the first and the second illustrative combinations wherein the storage array is flushed as part of the transition from the non-cacheable-access mode. Any of the first and the second illustrative combinations wherein the storage array is flushed as part of the transition to the cacheable-access mode. Any of the first and the second illustrative combinations wherein the storage array is flushed as part of the transition to the non-cacheable-access mode.

Any of the first and the second illustrative combinations wherein the storage array includes a plurality of entries and each entry is managed as a single object. The aforementioned illustrative combination wherein each entry includes at least one of a tag field, an address field, a data field, a valid field, a dirty field, and an access type field. The aforementioned illustrative combination wherein the access type field represents the respective entry being created from at least one of a cacheable reference and a non-cacheable reference. The aforementioned illustrative combination wherein all of the entries marked as being created from a non-cacheable reference are flushed during the transition from at least one of the non-cacheable access mode and the cacheable access mode. The aforementioned illustrative combination wherein all of the entries marked as being created from a cacheable reference are retained during the transition from at least one of the non-cacheable access mode and the cacheable access mode.

Any of the first and the second illustrative combinations further including a control register. The aforementioned illustrative combination wherein the control register specifies conditions relating to the events. The aforementioned illustrative combinations wherein the conditions include at least one of an instruction processor transitioning between power states, the instruction processor transitioning to a relatively lower-power state, the instruction processor transitioning to a relatively higher-power state, the instruction processor transitioning between performance levels, the instruction processor transitioning to a relatively lower performance level, the instruction processor transitioning to a relatively higher performance level, the instruction processor transitioning between snoop modes, a programmed directive to disable the non-cacheable access mode, a programmed directive to disable the cacheable access mode, a programmed directive to enable the non-cacheable access mode, and a programmed directive to enable the cacheable access mode. The aforementioned illustrative combination wherein a portion of the control register is a mode register.

Any of the first and the second illustrative combinations further including a mode register having fields specifying a range of physical memory addresses to process with the storage array. The aforementioned illustrative combination wherein the fields include at least one of an upper physical address range limit and a lower physical address range limit. The aforementioned illustrative combination wherein the mode register has additional fields specifying an additional range of physical memory addresses to process with the storage array. The aforementioned illustrative combination wherein the additional fields include at least one of an additional upper physical address range limit and an additional lower physical address range limit.

Any of the first and the second illustrative combinations wherein the storage array is operated to retain at least one of compressed data and uncompressed data corresponding to at least a portion of the compressed data. Any of the first and the second illustrative combinations wherein the storage array is operated to retain at least one of uncompressed data and compressed data corresponding to at least a portion of the uncompressed data.

Any of the first and the second illustrative combinations wherein the storage array is operated to retain compressed data and further including a display processor enabled to process the compressed data. The aforementioned illustrative combination wherein the processing of the compressed data includes expanding the compressed data. The aforementioned illustrative combination wherein the expanding of the compressed data produces uncompressed data retained in the storage array.

Any of the first and the second illustrative combinations wherein the storage array is operated to retain uncompressed data and further including a display processor enabled to process the uncompressed data. The aforementioned illustrative combination wherein the processing of the uncompressed data includes compressing the uncompressed data. The aforementioned illustrative combination wherein the compressing of the uncompressed data produces compressed data retained in the storage array.

Any of the aforementioned illustrative combinations having a display processor wherein the display processor is at least one of a graphics processing unit, a processing element of a microprocessor, and a visual display controller.

Any of the aforementioned illustrative combinations wherein the storage array is further operable as two partitions. The aforementioned illustrative combination wherein a first one of the two partitions retains non-cacheable data according to the non-cacheable access mode. The aforementioned illustrative combination wherein a second one of the two partitions retains cacheable data according to the cacheable access mode. The aforementioned illustrative combination wherein the retaining of the non-cacheable data overlaps in time with the retaining of the cacheable data. The aforementioned illustrative combination wherein a size of at least one of the partitions is specified by way of at least one of programming partition size mode information and dynamically determining a working set size. The aforementioned illustrative combination wherein the partition size mode information includes at least one of a number of ways and a per-way bit field.

A third illustrative combination of a method including the steps of operating a storage structure selectively in a non-cacheable mode and a cacheable mode; detecting an event; and transitioning from the non-cacheable mode to the cacheable mode in response to the detection of the event. The third illustrative combination further including transitioning from the cacheable mode to the non-cacheable mode in response to detection of an additional event.

A fourth illustrative combination of a method including the steps of operating a storage structure selectively in a non-cacheable mode and a cacheable mode; recognizing an event; and transitioning from the cacheable mode to the non-cacheable mode in response to the recognizing of the event. The fourth illustrative combination further including transitioning from the non-cacheable mode to the cacheable mode in response to recognition of an additional event.

Any of the third and the fourth illustrative combinations further including programming mode information to at least partially specify some of the events. Any of the third and the fourth illustrative combinations further including processing a portion of non-cacheable references with the storage structure. The aforementioned illustrative combination wherein the portion is determined at least in part according to a physical address range. The aforementioned further including programming further mode information to specify the physical address range. The aforementioned illustrative combination wherein the portion is further determined at least in part according to an additional physical address range. The aforementioned illustrative combination further including programming the further mode information to specify the additional physical address range. The aforementioned illustrative combination further including processing cacheable references with the storage structure.

Any of the third and fourth illustrative combinations further including allocating an entry in the storage structure in response to a non-cacheable access. The aforementioned illustrative combination wherein the allocating is performed while operating the storage structure in the non-cacheable mode. The aforementioned illustrative combination further including allocating an additional entry in the storage structure in response to a cacheable access. The aforementioned illustrative combination wherein the allocating of the additional entry is performed while operating the storage structure in the cacheable mode. The aforementioned illustrative combination further including marking the entry allocated while operating in the non-cacheable mode as a non-cacheable entry. The aforementioned illustrative combination further including marking the additional entry allocated while operating in the cacheable mode as a cacheable entry. The aforementioned illustrative combination further including flushing the entry marked non-cacheable when transitioning from the non-cacheable mode. The aforementioned illustrative combination further including flushing the entry marked cacheable when transitioning to the non-cacheable mode.

Any of the third and the fourth illustrative combinations wherein exiting the non-cacheable mode is in response to at least one of an instruction processor exiting a relatively lower-power state, the instruction processor exiting a relatively lower-performance mode, the instruction processor enabling snooping, and disabling the non-cacheable mode via software. Any of the third and the fourth illustrative combinations wherein exiting the cacheable mode is in response to at least one of the instruction processor exiting a relatively higher-power state, the instruction processor exiting a relatively higher-performance mode, the instruction processor disabling snooping, and disabling the cacheable mode via software. Any of the third and the fourth illustrative combinations wherein entering the non-cacheable mode is in response to at least one of the instruction processor entering a relatively lower-power state, the instruction processor entering a relatively lower-performance mode, the instruction processor disabling snooping, and enabling the non-cacheable mode via software. Any of the third and the fourth illustrative combinations wherein entering the cacheable mode is in response to at least one of the instruction processor entering a relatively higher-power state, the instruction processor entering a relatively higher-performance mode, the instruction processor enabling snooping, and enabling the cacheable mode via software.

Any of the third and the fourth illustrative combinations further including generating non-cacheable accesses by a non-cacheable access generating agent. The aforementioned illustrative combination further including processing at least one of the generated non-cacheable accesses via the storage structure while operating the storage structure according to the non-cacheable mode. The aforementioned illustrative combination wherein the non-cacheable access generating agent is at least one of a graphics processing element, a direct memory access device, and a visual display controller. The aforementioned illustrative combination wherein at least a portion of data associated with at least some of the non-cacheable accesses is at least one of compressed data and uncompressed data. The aforementioned illustrative combination wherein some of the compressed data is derived from the uncompressed data. The aforementioned illustrative combination wherein some of the uncompressed data is derived from the compressed data.

Overview

In various microprocessor systems non-cacheable and cacheable memory accesses may be used by devices to transfer data, frequently via DMA transactions. Some of the DMA transactions are "background" accesses that are needed even while the microprocessor system is otherwise not busy.

The non-cacheable accesses are advantageous since snooping is not necessary, resulting in reduced snooping bandwidth requirements and decreased power consumption. In conventional systems the non-cacheable accesses are satisfied from DRAM (instead of from cache). However, in embodiments described herein, under some situations, all or portions of the non-cacheable accesses are satisfied from a buffer/mini-cache (instead of from DRAM), and are performed according to non-cacheable semantics, thus transparently eliminating (or reducing) DRAM accesses. Operation of the buffer/mini-cache is not visible to other agents (other than a reduction in DRAM accesses) and requires no changes to pre-existing OS and related device driver code. The elimination of DRAM accesses decreases power consumption, as accessing the buffer/mini-cache uses less energy than accessing the DRAM.

For example, consider an enhanced single-chip microprocessor system having one or more CPUs, an embedded memory controller (for interfacing to DRAM, for example), and a buffer/mini-cache for satisfying non-cacheable accesses (as described herein). All of the CPUs and the memory controller may remain in a low-power state (or states) even while non-cacheable requests from other agents are satisfied by the buffer/mini-cache. In some embodiments the low-power states include ACPI-compatible low-power states (such as ACPI states C3, C4, C5, and so forth) that provide no snooping of caches. The non-cacheable requests may also be satisfied while performing fewer (or while performing no) DRAM accesses. Thus when the enhanced microprocessor is otherwise idle, such as when awaiting keyboard input and data being displayed by a GPU is unchanging but repeatedly accessed for display refresh, significant power savings may result by using the buffer/mini-cache.

In some respects the buffer/mini-cache is similar to a cache, and includes a memory structure having a plurality of lines each having data and state (such as a valid bit) and being associated with an address or address range. In response to detection of one of a collection of events, a change in an operational mode of the buffer/mini-cache is made (such as an entry into a low-power CPU state enabling the buffer/mini-cache to respond to non-cacheable accesses), under control of one or more state machines. All or any portion of control logic associated with the state machines also provides bidirectional coupling between selected non-cacheable accesses and the buffer/mini-cache. The selected non-cacheable accesses may be determined in part by physical address ranges (corresponding to DRAMs, for example) specified in one or more program-accessible mode registers.

The cacheable accesses are advantageous since special processing sometimes associated with non-cacheable accesses (such as explicit flushing of all or portions of a cache, for example) is not required. In conventional systems the cacheable accesses are satisfied from a CPU or an associated cache sub-system that form a coherency domain. Disadvantageously, the CPU or some portion of the associated cache sub-system must be powered up in order to perform the cacheable accesses (i.e. processor logic must exit any snoop disabled state). However, in embodiments described herein, under some situations, all or portions of the cacheable accesses are satisfied from the buffer/mini-cache instead of from the CPU or the cache sub-system. Thus the CPU and the cache sub-system may remain powered-down if otherwise idle (i.e. stay in a snoop disabled state) to significantly reduce power consumption.

System

FIG. 1 illustrates selected details of several embodiments of a system that implements transparent use of one or more buffer/mini-caches for satisfying selected non-cacheable accesses and for satisfying some background DMA device accesses. Satisfying selected non-cacheable accesses with one of the buffer/mini-caches enables a reduction in DRAM accesses and hence power consumption. Satisfying some DMA accesses enables a decrease in CPU and/or cache sub-system power-ups and hence power consumption. In some scenarios the system is included in a PC-compatible machine (such as a notebook or desktop computer, or an embedded application device). In some scenarios the system is included in a PDA-class device, or other similar mobile handheld or portable unit.

The system includes several solid-line box elements partitioned, according to various scenarios, into a variety of distinct integrated circuits (or chips), as shown by several dashed-line box elements. Three variations are illustrated by the figure. A first variation has a processor-included buffer/mini-cache (such as Buffer/Mini-Cache 112A) to satisfy selected non-cacheable accesses. The first variation further has a processor-external buffer/mini-cache (such as such as Buffer/Mini-Cache 112B) to satisfy some background DMA device accesses. A second variation has the processor-included buffer/mini-cache and lacks the processor-external buffer/mini-cache. A third variation has the processor-external buffer/mini-cache and lacks the processor-included buffer/mini-cache. In some usage scenarios Buffer/Mini-Cache 112A may also satisfy some background DMA device accesses. In some usage scenarios Buffer/Mini-Cache 112B may also satisfy selected non-cacheable accesses.

CPUs and cache(s) element 110, having one or more CPUs and associated caches and/or cache sub-systems, is coupled to (processor) Control unit 130A having Buffer/Mini-Cache 112A according to the first and second variations. The processor control unit is coupled via Link 120 to (chipset) Control unit 130B having Buffer/Mini-Cache 112B according to the first and the third variations. The chipset control unit is coupled to GPU/DMA Device(s) 115, (internal) DMA Device(s) 132, and (external) DMA Device(s) 133. Two techniques for interfacing to DRAM are illustrated. In the first technique, processor-centric DRAM Controller 113A is coupled to (processor) Control unit 130A and DRAMs 114A. In the second technique chipset-centric DRAM Controller 113B is coupled to (chipset) Control unit 130B and DRAMs 114B. Various embodiments may implement any combination of the DRAM interfacing techniques.

The partitioning scenarios include Processor Chip 102 implemented as a single integrated circuit having CPUs and cache(s) element 110, Control unit 130A (optionally including Buffer/Mini-Cache 112A according to variation), and optionally DRAM Controller 113A. The partitioning scenarios further include Chipset 103 having Control unit 130B (optionally including Buffer/Mini-Cache 112B according to variation), (internal) DMA Device(s) 132, and optionally DRAM Controller 113B implemented as another single integrated circuit. The partitioning scenarios further include Integrated Graphics Chipset 104 having Chipset 103 and GPU/DMA Device(s) 115 implemented as a single chip.

The partitioning scenarios further include Processor System 101 including all of the elements of Processor 102 and Chipset 103 implemented as a single chip. In some usage scenarios (single-chip) Processor System 101 is operated in conjunction with GPU/DMA Device(s) 115, (external) DMA Device(s) 133, and DRAMs 114A or 114B as separate chips. The partitioning scenarios further include Processor and DRAM Chip 100 including all of the elements of Processor Chip 102 and all or any portion of DRAMS 114A implemented in a single chip, multi-die, or multi-chip module. The partitioning scenarios further include Integrated Graphics and DRAM Chip 105 including all of the elements of Integrated Graphics Chipset 104 and all or any portion of DRAMs 114B implemented in a single chip, multi-die, or multi-chip module. The aforementioned partitioning scenarios are illustrative only, and not limiting, as other partitioning scenarios are possible and contemplated. For example, any elements described as being implemented in a single chip may be implemented as a single integrated circuit die included in a single-module package or a multi-module package.

The illustrated unit and block boundaries are not limiting, as other element divisions may be used. For example, all or portions of the chipset control unit and the processor-external buffer/mini-cache may be implemented in any of the DMA devices. For another example, the processor-included buffer/mini-cache may be implemented separately from the CPU and caches (as illustrated) or included wholly or partially in the CPU and caches. For another example, instances of the chipset control unit (or any portion thereof) and the processor-external buffer/mini-cache may be implemented in each of a plurality of DMA devices.

In embodiments of the first and the third variations (having at least the processor-external buffer/mini-cache), the system is enabled to perform selected non-cacheable accesses and some DMA operations even while all of the CPUs, the caches, the processor control unit, and the link coupling the processor to the chipset are powered off, or operated in a low power state where snooping, for example, is not provided. The chipset control unit remains operational when other elements are powered off (or in various low power states) and satisfies (via the processor-external buffer/mini-cache) selected non-cacheable accesses and some DMA requests generated internally and externally with respect to the chipset. Other elements of the chipset may remain powered down while the accesses and requests are satisfied, thus further reducing overall power consumption. Alternatively the chipset control unit (including the processor-external buffer/mini-cache) remains in low-power or powered-down states when the accesses and requests are not being processed, and temporarily transitions to operational states long enough to process the accesses and requests when received.

Similar to embodiments having at least the processor-external buffer/mini-cache, in embodiments of the first and the second variations (having at least the processor-internal buffer/mini-cache), the system is enabled to perform selected non-cacheable accesses and some DMA operations even while all of the CPUs, the caches, and portions of the chipset are powered off, or operated in a low power state where snooping, for example, is not provided. The processor control unit remains operational when other elements are powered off (or in various low-power states) and satisfies (via the processor-internal buffer/mini-cache) non-cacheable accesses and DMA requests passed from the chipset over the link. In order to recognize and communicate the accesses and the requests to the processor, the chipset control unit and the link remain operational, but other elements of the chipset may remain powered down while the accesses and requests are satisfied, thus reducing overall power consumption. Alternatively the processor control unit (including the processor-internal buffer/mini-cache), the link, and chipset control unit remain in low-power or powered-down states when the accesses and the requests are not being processed, and temporarily transition to operational states long enough to process the accesses and the requests when received.

In some embodiments the buffer/mini-cache (whether internal to or external to the processor) is synchronized (or made coherent with) any caching structure(s) implemented in the processor (such as first- and second-level caches L1s and L2s, respectively. In some embodiments the buffer/mini-cache is kept coherent incrementally, i.e. snooped as needed when the processor is performing accesses. In some embodiments the buffer/mini-cache is kept coherent by explicit flushes as the processor transitions from a non-snooping power state to a snooping power state. In some embodiments no explicit operations are performed to synchronize the buffer/mini-cache, i.e. it is operated incoherently with respect to any processor implemented caches. In some of the embodiments where the buffer/mini-cache is operated incoherently, system software guarantees no stale data remains in the buffer/mini-cache.

In some embodiments of the second variation (having the processor-included buffer/mini-cache and lacking the processor-external buffer/mini-cache), the chipset control operates as a link interface for the chipset. In some embodiments of the third variation (having the processor-external buffer/ mini-cache and lacking the processor-included buffer/mini-cache), the processor control operates as a link interface for the processor.

Buffer/Mini-Cache

Figure 2:
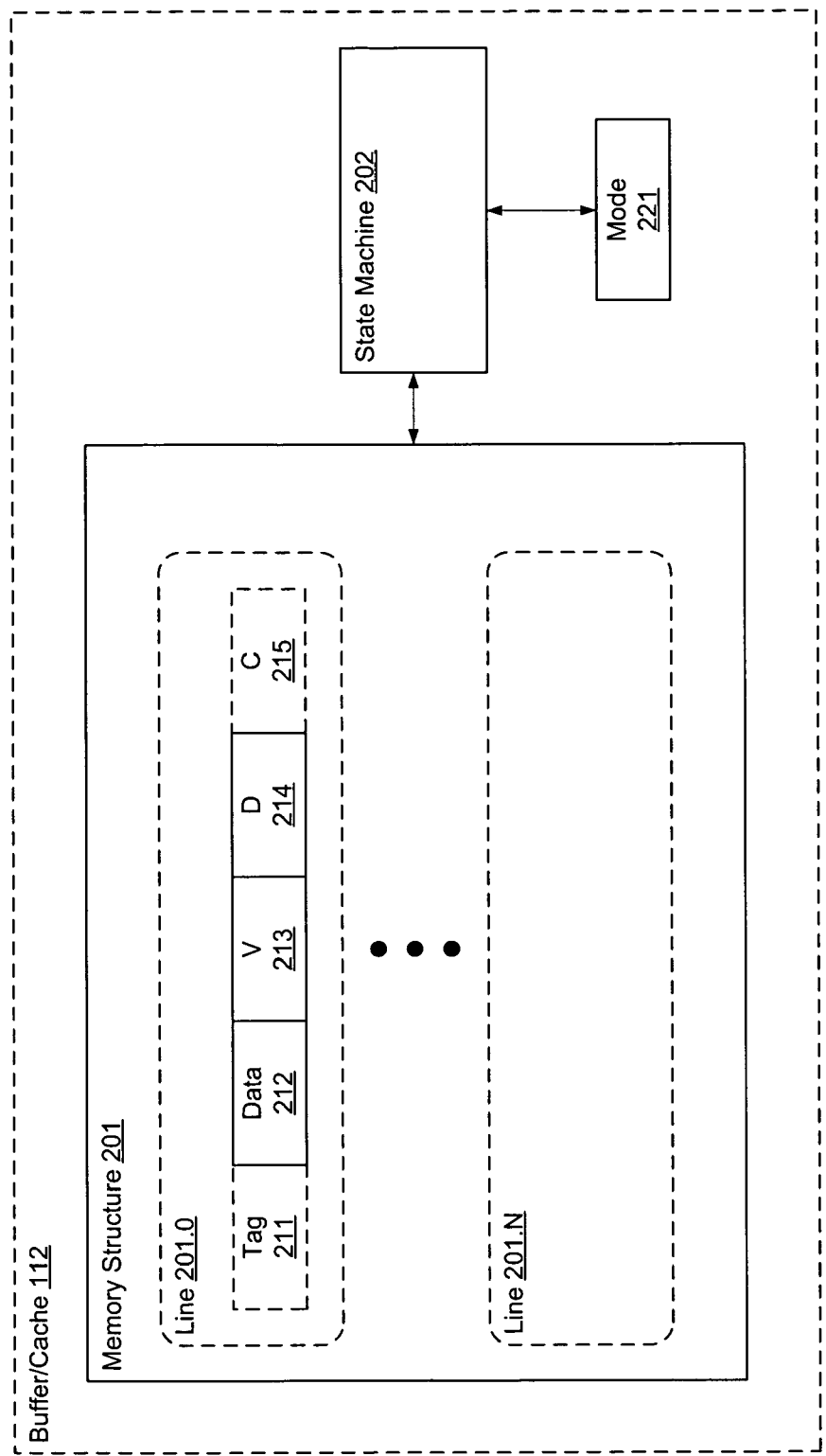
FIG. 2 illustrates selected aspects of an embodiment of either of the buffer/mini-caches of FIG. 1.

FIG. 2 illustrates selected aspects of an embodiment of either of Buffer/Mini-Caches 112A-B of FIG. 1 as Buffer/Mini-Cache 112. The buffer/mini-cache includes Memory Structure 201 operated under the control of and accessed by State Machine 202 and associated control logic in accordance with information from Mode register 221. The memory structure is organized into a plurality of identical entries (or groups of identical entries, according to embodiment) as shown by Lines 201.0 ... 201.N. Each line includes one or more fields of one or more bits, as exemplified by Line 201.0 having optional Tag field 211, Data field 212, Valid bit 213, Dirty bit 214, and optional Cacheable bit 215. In some embodiments any combination of the dirty and cacheable bits are implemented in a single field referred to hereinafter as a status field. The status field is not limited to two bits in width, and may including three or more bits to encode a variety of line status conditions.

In some embodiments the memory structure is similar to a cache, and may be organized in a direct-mapped manner (i.e. no tag field) or in a fully-associative manner (i.e. having a tag field for matching an entire line address). In some embodiments the memory structure is similar to a set-associative cache (a tag field matching a portion of the entire address) with two or more groups of lines operating as respective sets. In various embodiments the memory structure may be operated in any combination of modes including direct-mapped, fully associative, and set associative modes, in response to buffer/mini-cache control information provided by the state machine and associated control logic according to the mode register.

The mode register is not restricted to implementation in the buffer/mini-cache, and is not restricted to implementation as a single register. In some embodiments the mode register (or portions thereof) may be implemented in any element of the processor system or the chipset, including one or more MSRs associated with one of the processors or CPUs, the buffer/mini-cache (as illustrated in FIG. 2), and the DRAM controller(s).

In some embodiments the memory structure is identical to a conventional cache (i.e. Cacheable bit 215 is not present). In some embodiments the memory structure is adapted from a conventional cache. In some embodiments allocation and replacement functions of a conventional cache are used in part to manage the memory structure. In some embodiments the memory structure is combined with a portion of CPU caches, or integrated with an outer-level cache, such as an L2 or L3 cache (see the Processor-Included Buffer/Mini-Cache Embodiments section elsewhere herein for more information).

State Machine

Figure 3:
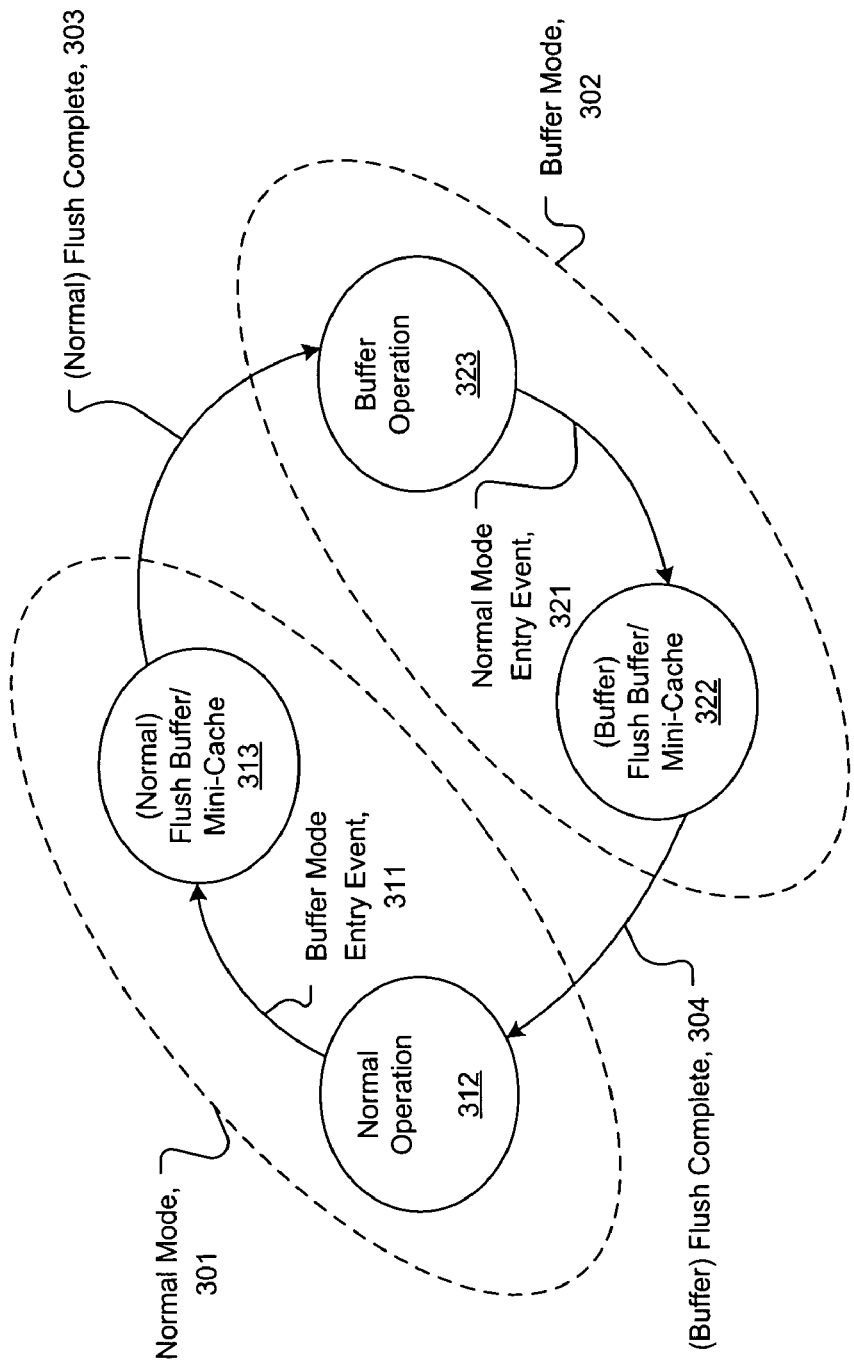
FIG. 3 illustrates selected aspects of an embodiment of a state machine adapted to control instances of the buffer/mini-cache of FIG. 2 to satisfy selected non-cacheable accesses.

FIG. 3 illustrates selected aspects (as a state diagram) of an embodiment of State Machine 202 adapted to control instances of Buffer/Mini-Cache 112 (of FIG. 2) to satisfy selected non-cacheable accesses (such as according to the foregoing first and third variations having a processor-external buffer/mini-cache). The state machine implements two groups of states according to normal and buffer operating modes as "Normal Mode" states 301 and "Buffer Mode" states 302 as shown by dashed-ellipses. While in the normal mode, non-cacheable accesses are not processed by the buffer/mini-cache, and while in the buffer mode, selected non-cacheable accesses may be processed by the buffer/mini-cache. Normal mode transitions to the buffer mode in response to one of a number of normal-to-buffer-mode events. Buffer mode transitions to the normal mode in response to one of a number of buffer-to-normal-mode events.

After transitioning to the normal mode, the state machine begins operation in "Normal Operation" state 312 where non-cacheable transactions are not processed by Buffer/Mini-Cache 112. The normal operation state is not exited until detection of one of the normal-to-buffer-mode events. Then the state machine transitions to "(Normal) Flush Buffer/Mini-Cache" state 313 via "Buffer Mode Entry Event" 311, where all dirty lines (if any) are flushed from the buffer/mini-cache to memory (such as either of DRAMs 114A or 114B of FIG. 1).

When flushing is complete the state machine transitions, via "(Normal) Flush complete" 303, to "Buffer Operation" state 323, where selected non-cacheable transactions may be processed by the buffer/mini-cache. The buffer operation state is not exited until detection of one of the buffer-to-normal mode events. Then the state machine transitions to "(Buffer) Flush Buffer/Mini-Cache" state 322 via "Normal Mode Entry Event" 321, where all dirty lines (if any) are flushed from the buffer/mini-cache. When flushing is complete the state machine transitions, via "(Buffer) Flush complete" 304, to "Normal Operation" state 312, where non-cacheable transactions are no longer processed by the buffer/mini-cache.

The normal-to-buffer mode events include a variety of programmable events such as time spent with one or more of the CPUs operating in a reduced-power state (e.g. one of ACPI-compatible C3, C4, C5, states and so forth) or a lower-performance mode. Detectable states/modes, time required in respective states/modes, and CPUs to be observed for operation in respective states/modes are programmable via mode information stored in Mode register 221 (of FIG. 2).

The buffer-to-normal mode events include a variety of programmable events such as one or more of the CPUs exiting one of the reduced power states, returning to operation in a higher performance mode (i.e. exiting the lower performance mode), or generating core traffic. The detectable states/modes, as well as CPUs to be observed for operation in respective states/modes, are programmable via mode information in the mode register. Some of the programmable events may also be related to a snoop bandwidth threshold that when exceeded is recognized as a buffer-to-normal event (see the Reduction of DRAM Accesses by Non-Cacheable Accesses section elsewhere herein for further information).

In some embodiments transitions to the buffer mode states are inhibited by enable/disable information from Mode register 221 (such as stored in a bit or field encoding in of the mode register). In some embodiments one of the buffer-to-normal mode events includes the enable/disable information indicating the buffer mode is to be disabled. In some embodiments one of the normal-to-buffer mode events includes the enable/disable information indicating the buffer mode is to be enabled. In some embodiments the enable/disable information is programmed by software executing on one of the CPUs (such as a driver writing to a bit or field of an MSR), and in some embodiments the enable/disable information is manipulated by the state machine (in conjunction with recognition of buffer-to-normal and normal-to-buffer events, for example).

In some embodiments the buffer mode may be operational even when one or all of the CPUs are not operating in a reduced-power, snooping disabled, or lower-performance state, such as when one or all of the CPUs are operating in an ACPI-compliant C0, C1, or C2 state or a higher-performance state.

Memory Range

Figure 4:
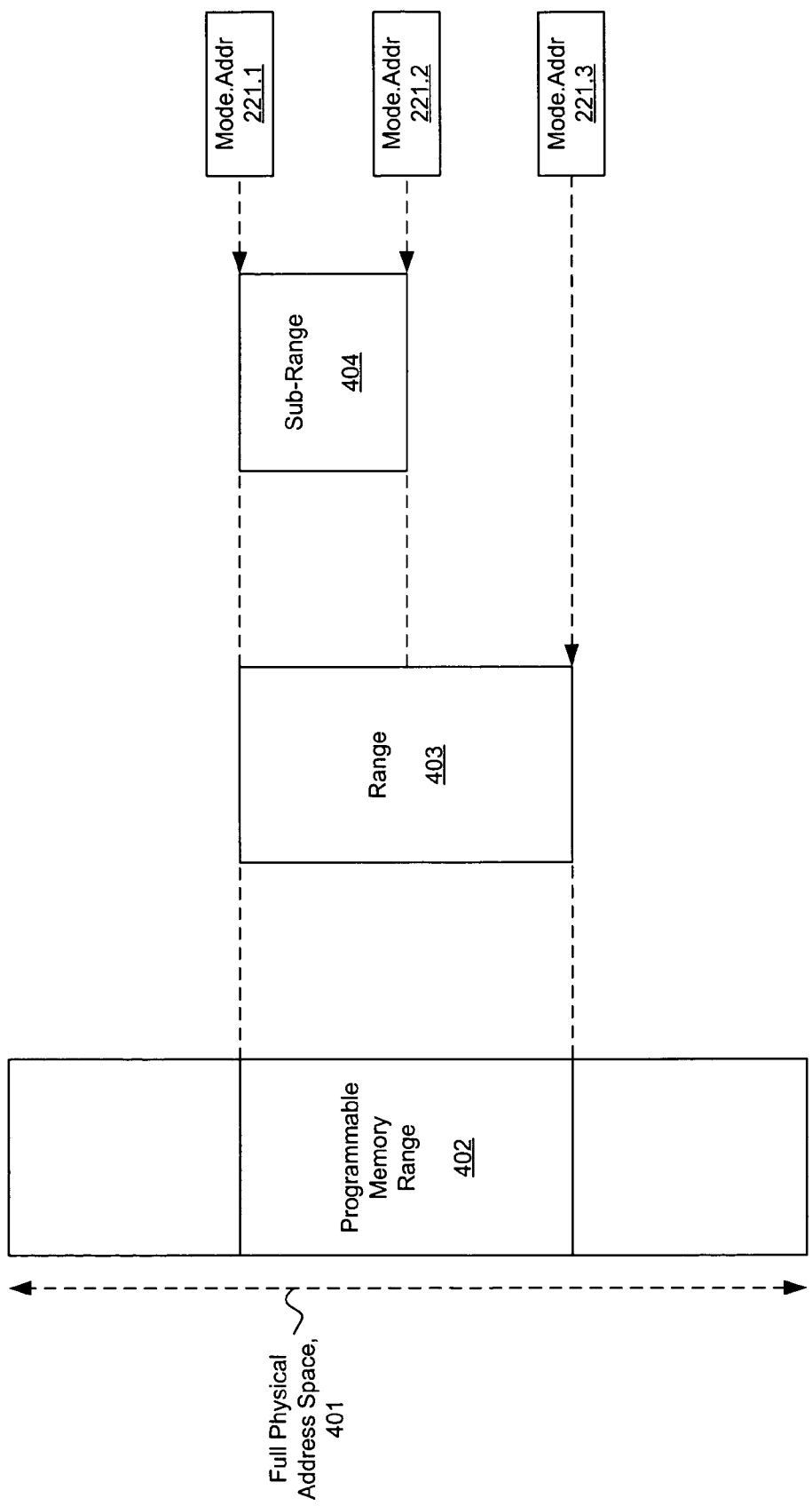
FIG. 4 illustrates an embodiment of memory range information used to determine selected matching non-cacheable accesses and selected matching DMA accesses for processing by instances of the buffer/mini-cache of FIG. 2.

FIG. 4 illustrates an embodiment of memory range information used to determine selected matching non-cacheable accesses and selected matching DMA accesses for processing by instances of Buffer/Mini-Cache 112. The entire physical address space implemented by the system is illustrated by Full Physical Address Space 401, having a Programmable Memory Range 402 that may be programmatically specified. When the buffer/mini-cache is operated in the buffer mode to process selected non-cacheable accesses, non-cacheable accesses falling within Programmable Memory Range 402 are processed by the buffer/mini-cache (and other non-cacheable accesses are not). When the buffer/mini-cache is operated to satisfy selected matching DMA accesses (either in the coherent or the incoherent fashion), DMA accesses falling within Programmable Memory Range 402 are processed by the buffer/mini-cache (and other DMA accesses are not).

In some embodiments the programmable memory range is specified as Range 403, having highest and lowest physical addresses as defined respectively by contents of Mode Address fields 221.1 and 221.3. In some embodiments only a portion of the buffer/mini-cache is allocated to processing of non-cacheable accesses in buffer mode, as conceptually illustrated by Sub-Range 404 as defined by contents of Mode Address field 221.2. In some embodiments the portion allocated may be specified by other mechanisms (such as a number of ways or specific selections of ways) and is not necessary restricted to a specification of a single contiguous physical address range.

In some embodiments any combination of Mode Address fields 221.1-221.3 are implemented as fields of Mode register 221 of FIG. 2. In some embodiments any combination of the mode address fields are implemented in individual mode registers. In some embodiments any combination of the mode address fields are implemented in MSRs located in one or more CPUs implemented in CPUs and cache(s) element 110, Processor Chip 102, Processor System 101, and Processor and DRAM Chip 100 of FIG. 1.

Although the aforementioned memory range is described with respect to a single memory range, various embodiments may provide for a plurality of ranges (and sub-ranges). Each of the ranges (and sub-ranges) may be specified independently with respect to each other. For example, a first plurality of programmable memory ranges may be specified for the non-cacheable access buffer operation, a second plurality of ranges for the DMA access coherent operation, and a third plurality of ranges for the DMA access incoherent operation. In embodiments having a plurality of buffer/mini-caches, separate programmable memory ranges may be specified for each of the buffer/mini-caches, or alternatively one or more of the ranges may be shared by one or more of the buffer/mini-caches.

In some embodiments all or a portion of the ranges are programmable by address-observation logic implemented to monitor DMA transfer addresses over time (see the Reduced Power DMA Accesses section elsewhere herein for more information).

Reduction of DRAM Accesses by Non-Cacheable Accesses

Operation to reduce DRAM accesses by processing selected non-cacheable accesses by a buffer/mini-cache (such as according to the foregoing first and third variations having a processor-external buffer/mini-cache) is as follows. After a system reset, a CPU included in CPUs and cache(s) element 110 executes software to program memory range and operational mode information in Mode register 221 (of FIG. 2) to specify non-cacheable accesses to optimize. The buffer/mini-cache (such as Buffer/Mini-Cache 112B of FIG. 1) begins processing according to "Normal Operation" state 312 (of FIG. 3), and non-cacheable accesses, such as generated by GPU/DMA Device(s) 115 of FIG. 1, are not processed by the buffer/mini-cache. After a programmable event has occurred (such as time spent in a low power/performance state) State Machine 202 (of FIG. 2) begins to enable caching of matching non-cacheable transactions in the buffer/mini-cache by flushing all dirty lines (if any) in the buffer/mini-cache and marking all lines in the buffer/mini-cache as invalid (such as by a deasserted Valid bit 213). After the buffer/mini-cache is completely flushed the buffer/mini-cache is operated in the buffer mode, and matching non-cacheable transactions are processed by the buffer/mini-cache.

A non-cacheable transaction generated by the GPU/DMA device is compared to the ranges (such as described by Programmable Memory Range 402 of FIG. 4), and if the address of the non-cacheable transaction matches one of the ranges, then it is processed with the buffer/mini-cache (non-matching transactions are processed elsewhere, such as with either of DRAMs 114A or 114B of FIG. 1). The matching non-cacheable (and in some embodiments optionally matching cacheable) transactions are processed by the buffer/mini-cache akin to processing by a conventional cache having allocation, replacement, and snooping policies. In some embodiments the allocation policy is generally set to allocate on read so that after a line has been read once from the DRAM the line resides in the buffer/mini-cache. In some embodiments the allocation policy includes allocating on a write or writing through.

The replacement policy may be random, LRU, FIFO, fixed-order, round-robin, greedy, or any other policy enabling (or readily adapted to enable) high utilization of the buffer/mini-cache capacity while avoiding poor performance when the non-cacheable access ranges exceed the capacity. In some embodiments the replacement policy is tuned so that DRAM accessed are reduced, minimized, or grouped in time to enable various system elements (such as CPUs, memory controllers, and DRAMs) to reach lower power states by elimination of DRAM accesses. In some implementations the tuned replacement policy includes allocating only if there is a 'free' line (or entry), and not allocating otherwise, i.e. allocating continues only while free lines are available and stops when there are no more free lines left. The free lines may be invalid entries, or may be any entry allocated before entering the buffer mode when using a fixed-order replacement policy (from way 0 to way N−1, for example). Traffic that regularly sweeps an address range that wholly fits in the buffer/mini-cache is managed optimally, while sweeps that overflow the buffer/mini-cache tend to be managed optimally, as the entire capacity of the buffer/mini-cache will be accessed, thus reducing DRAM accesses and associated power consumption. The DRAM accesses will also tend to be clumped together in time, as the overflowing sweep portion is a coalesced whole, thus enabling the DRAM (and the memory controller) to enter low power states.

In some usage scenarios non-cacheable data is not retained in the buffer/mini-cache (even in the buffer mode) when snoop bandwidth is high, or alternatively non-cacheable data is retained in the buffer/mini-cache only when it is known that required additional snoop bandwidth will be small and/or well controlled via the matching ranges (such as for graphics refresh traffic). In some usage scenarios the buffer mode is exited when snooping pressure approaches a peak or exceeds a programmed threshold (see the State Machine section located elsewhere herein for further information).

In some embodiments the buffer/mini-cache is operated akin to a direct-mapped cache covering only as much of the matching address range(s) as the capacity of the buffer/mini-cache allows. The tag fields (such as Tag field 211 of FIG. 2 having an address) are unused but the valid bits (such as Valid bit 213 of FIG. 2) are used. As non-cacheable reads matching one of the ranges are received, the valid bits of the buffer/mini-cache are accessed. If the read misses (i.e. the corresponding valid bit is clear), then the read data is fetched from DRAM, copied into the buffer/mini-cache (such as in Data field 212 of FIG. 2), and the valid bit set. If the read hits (i.e. the valid bit is set), then data is provided from the buffer/mini-cache (such as from Data field 212). In some usage scenarios the buffer/mini-cache operated in direct-mapped mode may allocate on write or write through.

After another programmable event has occurred (such as exiting a low power/performance state), the state machine begins to disable caching of non-cacheable accesses by disabling allocation of lines in the buffer/mini-cache while processing non-cacheable accesses, flushing all dirty lines (if any) in the buffer/mini-cache, and marking all lines as invalid. After the buffer/mini-cache is completely flushed the buffer/mini-cache is operated in the normal mode, and non-cacheable transactions are not processed by the buffer/mini-cache. In some operating modes the buffer/mini-cache is operated as a conventional cache while in the normal mode.

In some embodiments or operating modes the buffer/mini-cache is reserved entirely (in the buffer mode) for processing of (matching) non-cacheable accesses. In some embodiments or operating modes the buffer/mini-cache processes cacheable accesses in the normal mode as well as the buffer mode, and Cacheable bit 215 of FIG. 2 is used to differentiate lines allocated for cacheable accesses (such as Cacheable bit 215 asserted) and lines allocated for non-cacheable accesses (such as Cacheable bit 215 deasserted). In some operating modes flushing of lines (such as when transitioning between the buffer and the normal modes) is conditional upon the differentiation, such as only non-cacheable lines are flushed when transitioning.

In some embodiments only a portion of the buffer/mini-cache is operated in the buffer mode to process non-cacheable transactions, while the remainder is operated in the normal mode to process cacheable transactions. In some implementations the portion is configurable by mode information or dynamically when the buffer mode is entered. The dynamic configuring enables learning of a working set and determination (and optimization) of a fraction of the buffer/mini-cache used in the buffer mode. In some implementations the remainder is turned off if flushed or operated in a data retention only state (i.e. not accessed) if not flushed to reduce power consumption. In some operational modes a section of the buffer/mini-cache is always operated in the buffer mode, so matching non-cacheable accesses are always processed by the section. Specification of the portion of the buffer/mini-cache to operate (conditionally) in the buffer mode and specification of the section always operated in the buffer mode may be by identifying a number of ways or alternatively setting a bit for each way to use in each set of the buffer/mini-cache. The setting for the number of ways and the bits may be accessible to software executing on one of the CPUs via one or more MSR(s) implementing all or portions of the mode register.

Any combination of the replacement, allocation, and snooping policies used in conjunction with the buffer/mini-cache may vary according to operation in the normal mode and the buffer mode. For example, in the buffer mode the allocation policy is enhanced to recognize non-cacheable references to a buffer memory region and cache the recognized references. As another example, in some embodiments where cacheable and non-cacheable data are co-resident in the buffer/mini-cache during the normal and the buffer modes, the non-cacheable data allocation may be limited to read-only access. The limiting enables eviction of a non-cacheable line during operation in the normal mode by replacement processing. As another example, in some embodiments only lines of the buffer/mini-cache used to buffer graphics and/or frame buffer traffic are snooped.

Reduced Power DMA Accesses

Figure 5:
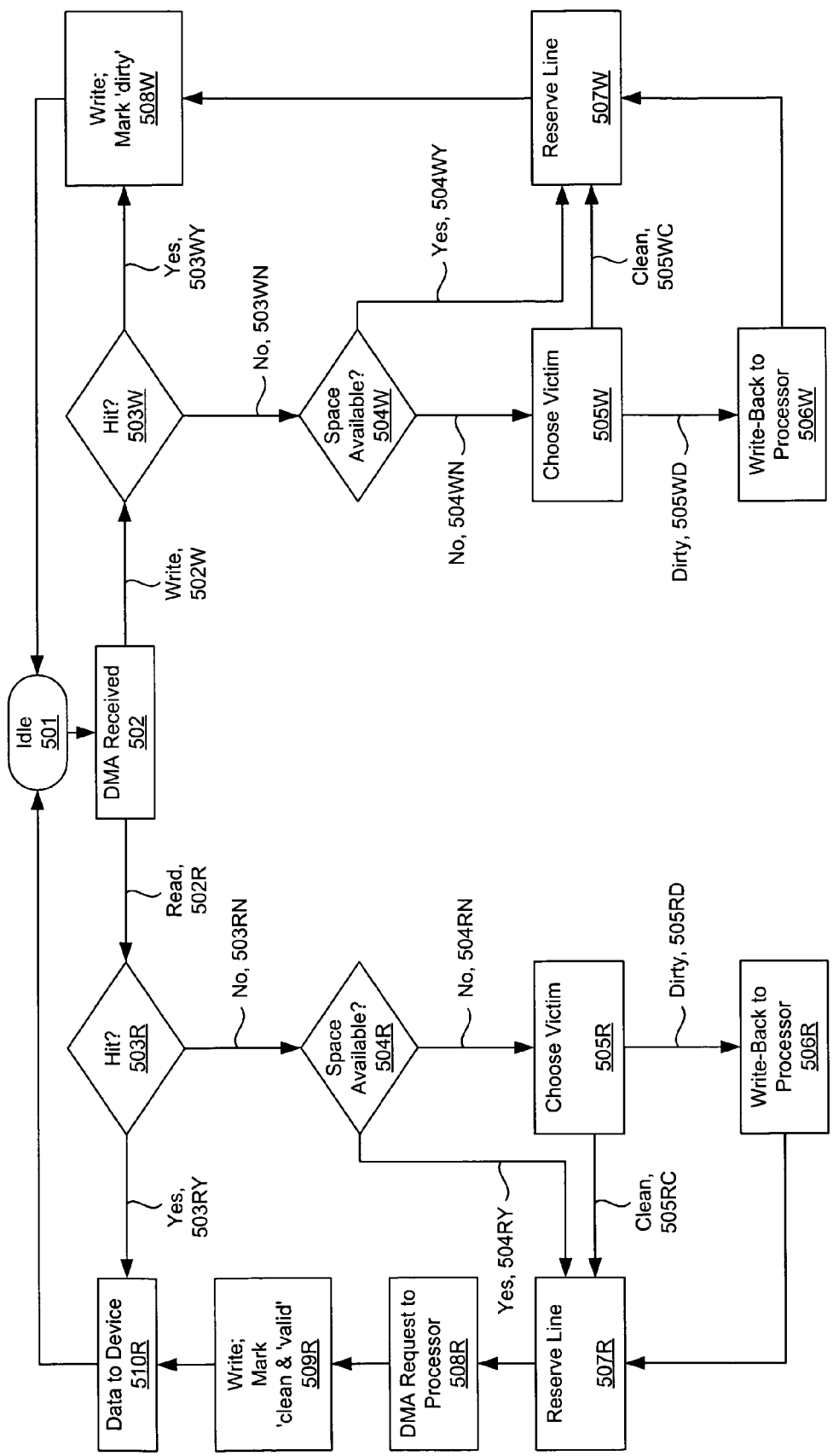
FIG. 5 illustrates selected operations performed by an embodiment implementing a coherent buffer/mini-cache for satisfying background DMA device accesses.
Figure 6:
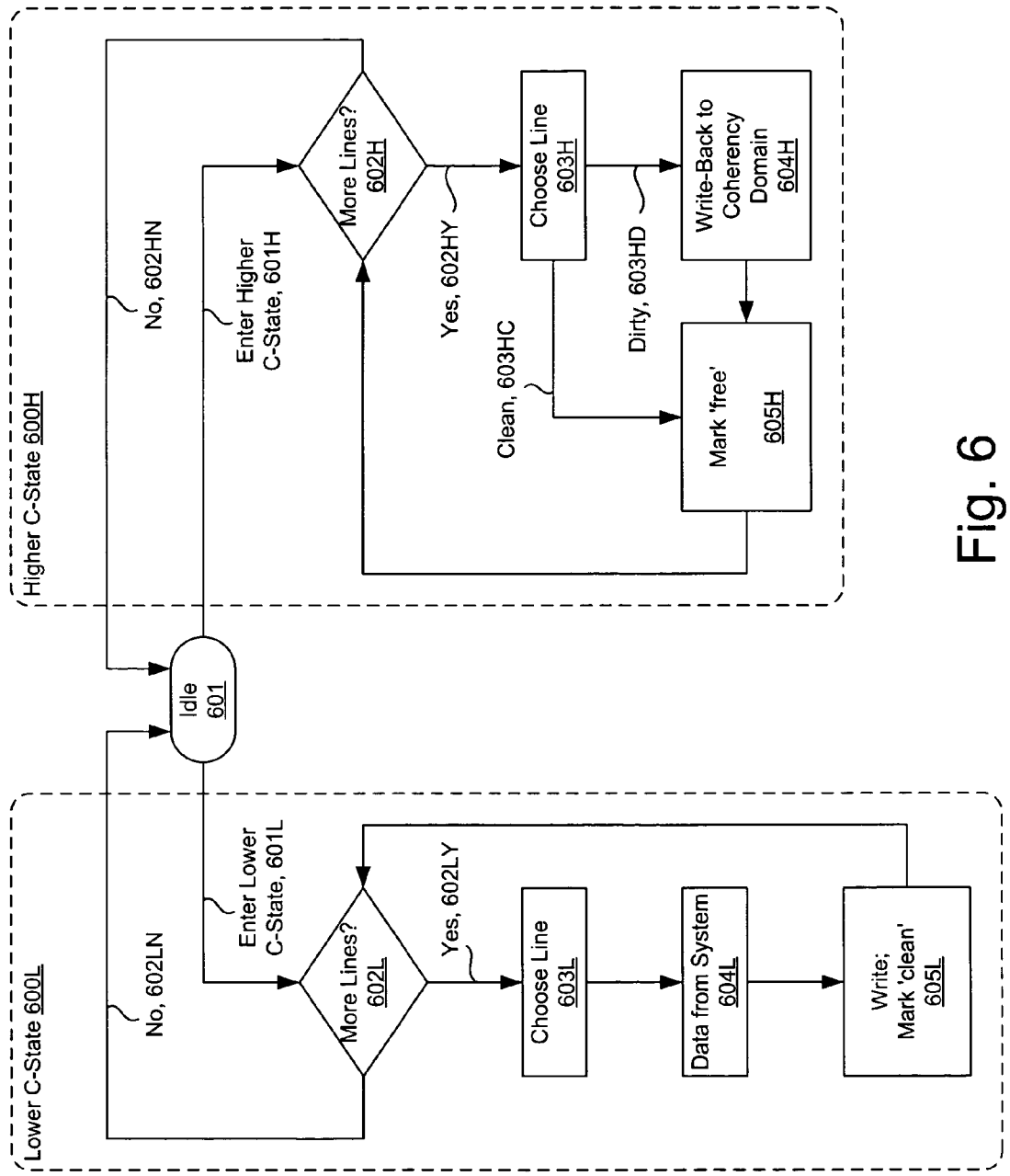
FIG. 6 illustrates selected operations performed by an embodiment implementing an incoherent buffer/mini-cache for satisfying background DMA device accesses.

Operation of a buffer/mini-cache to process selected DMA accesses without powering-up (or snoop-enabling) all or portions of a CPU or associated cache sub-system may be according to a coherent flow or according to an incoherent flow. FIG. 5 is with respect to the coherent flow and FIG. 6 is with respect to the incoherent flow. Any combination of the coherent and the incoherent flows may be used in any of the first, second, and third variations having either of a processor-internal or processor-external buffer/mini-cache.

Operation of embodiments where the buffer/mini-cache is external to the processor or included in the chipset (such as processor-external Buffer/Mini-Cache 112B of FIG. 1) enable the link coupling the processor and chipset to remain powered down as long as the buffer/mini-cache is servicing DMA requests, and bus and snoop logic in the processor may remain in low-power states even while the DMA requests are serviced, leading to high power savings. In usage scenarios where the buffer/mini-cache is flushed, the processor is temporarily "popped up" to a higher-power state (such as transitioning from C3, C4, C5, and so forth to C2, C1, or C0) to service write backs associated with the flush. The chipset, operating in conjunction with the processor, postpones processing memory traffic until all buffer/mini-cache modified state (dirty lines, for example) is flushed to the processor and associated coherency domain. In some embodiments the chipset is enabled to fully participate in the coherency domain (such as so-called "front-side" bus systems implemented by some X86-compatible systems). In some embodiments where the chipset fully participates in the coherency domain the buffer/mini-cache may be operated as a coherent cache and is snooped, avoiding explicit flushing.

Operation of embodiments where the buffer/mini-cache is included in the processor (such as processor-internal Buffer/Mini-Cache 112A of FIG. 1) power up the link coupling the processor and the chipset whenever DMA activity is to be processed in order to communicate the DMA activity from the chipset to the processor where the buffer/mini-cache resides. Thus the processor keeps at least a portion of the processor control unit powered up to respond to the DMA activity. In embodiments where the buffer/mini-cache is operated in the incoherent fashion, the buffer/mini-cache is explicitly flushed when cache systems associated with the processor become operational (such as when the processor exits a low-power or non-snooping state to a fully-operational and/or snooping state). In embodiments where the buffer/mini-cache is operated in the coherent fashion, explicit flushes are not used, although incrementally maintaining coherence results in additional power consumption.

The buffer/mini-cache, when used to process DMA accesses, may be operated with any suitable replacement policy. In some embodiments replacement policies select new (or unused) cache lines instead of or with a higher priority than used lines, allowing the buffer/mini-cache to buffer additional modified data before requiring write backs. In usage scenarios where an amount of data transferred fits in the buffer/mini-cache, selecting unused lines over used lines enables the entire data transfer to simultaneously reside in the buffer/mini-cache.

In usage scenarios where a transferred dataset is too large for the buffer/mini-cache, or data associated with an address changes over time, then in some embodiments several replacement policies are used depending on operating context. For example, if the dataset is "fixed" but too large (i.e. overflows the buffer/mini-cache without writing over data in the buffer/mini-cache), then only unused lines are allocated, and allocation ceases when all unused lines are used. Stopping allocation after using all lines tends to bunch together overflowing accesses, resulting in more power-efficient operation. If the dataset is continuously changing (i.e. writing over data in the buffer/mini-cache), then allocation may cease when the buffer/mini-cache is full. Alternatively allocation may follow an LRU or an MRU policy depending on whether old data continues to be accessed. In some embodiments replacement policy state, (such as LRU or MRU state) is updated irrespective of power-state processors are operating in. In some embodiments the replacement policy state is updated only when the processor(s) are operating in a C3 or deeper power state.

The valid bit in a line of the buffer/mini-cache (such as Valid bit 213 of FIG. 2) is cleared on system reset to an 'invalid' encoding, and the status field in the line (such as a status field implemented by Dirty bit 214 in combination with optional Cacheable bit 215 of FIG. 2) is written to a 'free' encoding. System reset processing continues by resetting the remaining valid bits and writing the remaining status fields until all lines in the buffer/mini-cache are marked 'invalid' and 'free'. In some embodiments all of the lines are processed simultaneously, and in some embodiments some of the lines are processed sequentially.

After the system reset processing is complete, as lines are brought into the buffer/mini-cache, the corresponding valid bit is written to a 'valid' encoding. The corresponding status field is set to a 'clean' encoding for DMA read operations or to a 'dirty' encoding for DMA write operations. When a line is flushed the status field is written to 'free' but the valid bit remains 'valid'.

When a DMA operation is requested, the control unit that includes the buffer/mini-cache is powered up and the buffer/mini-cache is accessed to process the DMA operation. If the buffer/mini-cache contains read data for the operation (i.e. "hits") or has space to store write data of the operation, then the buffer/mini-cache services the DMA operation without using any portion of any processor cache systems. If the buffer/mini-cache does not contain the read data (i.e. "misses") or has no room for the write data, then a processor is "popped-up" or transitioned to a snooping state (such as C2 or higher) where the processor is enabled to respond to coherent traffic, and requested to service the DMA operation. The buffer/mini-cache is then updated with data provided by the processor. After a programmable amount of time (specified, for example, by information from Mode register 221 of FIG. 2), the processor is allowed to return to a lower power state.

When a power-state-transitioning (or "break") event is detected that is unrelated to DMA operations satisfied by the buffer/mini-cache, the buffer/mini-cache is first synchronized with the processor (and any associated caches) by flushing and then memory operations (including DMA operations) are allowed to proceed.

In some embodiments the buffer/mini-cache is activated only in low-power states (such as any of C3, C4, C5, and deeper states) where coherent DMA is not otherwise supported and cache systems associated with processors (in the low-power states) are not operational. In some embodiments that implement an X86-compatible processor the buffer/mini-cache is not activated in the C3 power state, but is in the C4 and deeper power states. In some embodiments the buffer/mini-cache is activated in higher-power states (such as any of C2, C1, and C0).

In some embodiments only a portion of DMA requests are processed by the buffer/mini-cache, filtered by one or more physical address ranges (see the Memory Range section elsewhere herein). In some embodiments all or a portion of the address ranges are programmed by a processor or CPU. In some embodiments all or a portion of the ranges are programmed by address-observation logic via dynamic observation of DMA transfers over selected periods of time, either when processor cache state is inaccessible due to operation in a low-power state, when processor cache state is accessible, or both, according to various implementations. In some embodiments (such as some implementations having the buffer/mini-cache in the chipset) the filtering is according to DMA device identifiers (instead of or in addition to address ranges). For example, mode information may be programmed to identify devices that continue running even when processors are powered down or asleep (such as network and USB interfaces), and only DMA accesses from the identified devices are processed by the buffer/mini-cache (irrespective of addresses associated with the accesses).

In some embodiments the processor may "pre-fill" all or portions of the buffer/mini-cache before entering a low-power (such as a non-snooping) state. The processor locates 'valid' lines in the buffer/mini-cache and fills in the corresponding data according to address information in the corresponding tag field. In usage scenarios where DMA operations that transpire while the processor is in a low-power state are to the same lines as previous intervals where the buffer/mini-cache was operational, the pre-filling reduces processor power state pop-ups otherwise required to process buffer/mini-cache misses.

In some embodiments the processor may pre-fill all or portions of the buffer/mini-cache with data provided by device drivers associated with DMA devices that will potentially generate DMA accesses while the processor is in a low-power state. The device drivers determine (or are enabled to have knowledge of) addresses associated with requests originating from the DMA devices. Data from the addresses associated with the requests is copied to the buffer/mini-cache and tag information is set accordingly.

In some embodiments the buffer/mini-cache is operated in conjunction with relatively fine-grained power-control of processor cache systems. For example, the buffer/mini-cache may be active when all or any portion of the caches in all or any portion of the processors include no valid data (i.e. are totally powered down without retaining state) and are therefore not enabled for snooping, or include valid data (i.e. are powered up sufficiently to retain data) but are not enabled for snooping. For another example, the buffer/mini-cache may be active when an "inner" portion of a cache system is not enabled for snooping (such as one or more first-level caches), and an "outer" portion of the cache system is enabled for snooping (such as one or more second- or third-level caches), and may thus respond to coherent transactions. For another example, the buffer/mini-cache may be active when an the inner portion is not enabled for snooping, a part of the outer portion (such as the second-level cache) has been cleaned and disabled for snooping, and the remainder of the outer portion (such as the third-level cache) is enabled for snooping. The cleaning may be performed by any combination of hardware and software agents.

Reduced Power DMA Accesses: Coherent Operation

FIG. 5 illustrates selected operations performed by an embodiment implementing a coherent buffer/mini-cache (either processor-internal such as Buffer/Mini-Cache 112A of FIG. 1 or processor-external such as Buffer/Mini-Cache 112B of FIG. 1) for satisfying background DMA device accesses. Processing is according to two major flows, one for each of a DMA read access and a DMA write access. Processing for either flow begins ("Idle" 501) with a DMA access from a DMA device ("DMA Received" 502), and processing continues according to the type of access (i.e. read or write).

Processing of a DMA read ("Read" 502R) begins by determining whether the read may be satisfied by data already present in the buffer/mini-cache, such as either of Buffer/Mini-Caches 112A-B of FIG. 1 ("Hit?" 503R). If not ("No" 503RN), then processing continues to determine if the buffer/mini-cache has any remaining lines available for allocation ("Space Available?" 504R). If not ("No" 504RN), then a line is selected for eviction from the buffer/mini-cache ("Choose Victim" 505 R). If the selected line has any modified data ("Dirty" 505RD), then the line is stored in the coherency domain ("Write-Back to Processor" 506R). The line then is allocated for the DMA read being processed ("Reserve Line" 507R). If the line was previously not dirty ("Clean" 505RC), then no write-back is performed and the line is immediately allocated ("Reserve Line" 507R). If there is a remaining line available ("Yes" 504RY), then no victim is chosen (and hence there is also no write-back) and a selected line is immediately allocated ("Reserve Line" 507R).

After the line is allocated for the DMA read data, the DMA access is passed to the coherency domain for further processing ("DMA Request to Processor" 508R). Data is provided by the coherency domain (such as after popping-up to a snoop-enabled state), stored in the allocated buffer/mini-cache line, and marked as 'clean' and 'valid' ("Write; Mark 'clean' & 'valid'" 509R). The data is also provided to the DMA device ("Data to Device" 510R), processing of the DMA access is complete, and waiting begins for a new DM-A access ("Idle" 501). If the buffer/mini-cache already has the data necessary to satisfy the DMA read access ("Yes" 503RY), then no miss processing is required, and data is immediately delivered to the DMA device ("Data to Device" 510R), omitting line allocation and filling operations.

Processing of a DMA write ("Write" 502W) begins by determining whether a line for the write may already be allocated in the buffer/mini-cache ("Hit?" 503W). If not ("No" 503WN), then processing continues to determine if the buffer/mini-cache has any remaining lines available for allocation ("Space Available?" 504W). If not ("No" 504WN), then a line is selected for eviction from the buffer/mini-cache ("Choose Victim" 505 W). If the selected line has any modified data ("Dirty" 505WD), then the line is stored in the coherency domain ("Write-Back to Processor" 506W). The line is then allocated for the DMA write being processed ("Reserve Line" 507W). If the line was previously not dirty ("Clean" 505WC), then no write-back is performed and the line is immediately allocated ("Reserve Line" 507W). If there was a remaining line available ("Yes" 504WY), then no victim is chosen (and hence there is also no write-back) and a selected line is immediately allocated ("Reserve Line" 507W).

After the line is allocated for the DMA write data, the DMA write data is stored therein and marked as not clean ("Write; Mark 'dirty'" 508W). Processing of the DMA access is then complete, and waiting begins for a new DMA access ("Idle" 501). If the buffer/mini-cache already has a line allocated for the DMA write ("Yes" 503WY), then no miss processing is required, and the DMA write data is immediately stored into the buffer/mini-cache ("Write; Mark 'dirty'" 508W), omitting line allocation operations.

Reduced Power DMA Accesses: Incoherent Operation

FIG. 6 illustrates selected operations performed by an embodiment implementing an incoherent buffer/mini-cache (either processor-internal such as Buffer/Mini-Cache 112A of FIG. 1 or processor-external such as Buffer/Mini-Cache 112B of FIG. 1) for satisfying background DMA device accesses. Processing is according to two major flows, one for each of an entry to a lower-power state ("Lower C-State" 600L) and an entry to a higher-power state ("Higher C-State" 600H).

Processing for the entry to the lower-power state serves to fill (or "pre-fill") the buffer/mini-cache with as much data from the coherent domain as possible so that as many DMA accesses as possible may be satisfied by the buffer/mini-cache without powering-up coherency domain elements such as CPUs or associated cache sub-systems. The entry to the lower-power state is conditional on completion of the filling, irrespective of whether the entire buffer/mini-cache is filled or none of the buffer/mini-cache is filled.

The lower-power state entry processing begins ("Idle" 601) with a notification of a desired transition to a lower-power C-state ("Enter Lower C-State" 601L), such as when entering a deep C-state (e.g. C3, C4, or so forth). A determination is made as to whether there are any remaining lines in the buffer/mini-cache that are available to receive system data, i.e. that have a 'valid' tag and have a 'free' status ("More Lines?" 602L). If so ("Yes" 602LY), then processing continues to select one of the 'valid' and 'free' lines ("Choose Line" 603 L). Data is then obtained from the coherent domain for storage into the selected line ("Data from System" 604L). The data is stored into the line and marked as clean ("Write; Mark 'clean'" 605L), leaving the line unavailable for additional system data, as the line is no longer 'free'.

Flow then loops back to determine if there are any additional lines available in the buffer/mini-cache to receive system data ("More Lines?" 602L). If there are no additional lines available ("No" 602LN), then the buffer/mini-cache filling in preparation for the entry into the lower-power state is complete, the buffer/mini-cache is ready to enter the lower-power state, and flow loops back to await another C-state transition ("Idle" 601).

In some embodiments the processing relating to entering a reduced-power state ("Lower C-State" 600L) is omitted, i.e. there is no "pre-filling" of the buffer/mini-cache.

Processing for the entry to the higher-power state (or snoop-enabled state) serves to synchronize the buffer/mini-cache with the coherency domain by emptying the buffer/mini-cache of data cached while any of the coherency domain elements (such as CPUs or associated cache sub-systems) were in a lower-power (or snoop-disabled) state. Thus the buffer/mini-cache is explicitly flushed of all data that may be newer than corresponding data in the coherency domain.

Processing for the entry to the higher-power state begins ("Idle" 601) with a notification of a desired transition to a higher-power C-state ("Enter Higher C-State" 601H), such as when entering a snoop-enabled C-state (e.g. C2, C1, or C0). A determination is made as to whether there are any remaining lines in the buffer/mini-cache that may have new data to be written back to the coherency domain, i.e. that have a status other than 'free', such as 'clean' or 'dirty' ("More Lines?" 602H). If so ("Yes" 602 HY), then processing continues to select one of the not 'free' lines ("Choose Line" 603 H). If the selected line has any modified data, such as indicated by a status of 'dirty' ("Dirty" 603HD), then the line is stored in the coherency domain ("Write-Back to Coherency Domain" 604H) and the line status is then changed to 'free' ("Mark 'free'" 605H). If the selected line has no modified data, such as indicated by a status of 'clean' ("Clean" 603HC), then the write-back is omitted and the line state is immediately changed to free ("Mark 'free'" 605H).

Flow then loops back to determine if there are additional lines to examine for possible new data ("More Lines?" 602H). If there are no additional lines to process ("No" 602HN), then the buffer/mini-cache is synchronized with the coherency domain and accesses to the coherency domain may resume, the buffer/mini-cache is ready to enter the higher-power state, and flow loops back to await another C-state transition ("Idle" 601).

Data Compression/Decompression

In some embodiments data stored in the buffer/mini-cache (such as graphics refresh data) is retained in a compressed form, and decompressed when accessed. Either or both compression and decompression operations may be performed in any combination of the GPU and the processor system (or the chipset, if implemented as a separate device), according to various embodiments.

In embodiments where decompression is relatively less computationally expensive than compression, processing may include the following. Raw frame buffer data is requested by the GPU from the processor system (or the chipset) according to an address range corresponding to an uncompressed representation of the frame buffer. The processor system (or the chipset) fetches raw (i.e. uncompressed) frame buffer data from memory (including any combination of processor write buffers, first- and second-level caches, the buffer/mini-cache, and DRAM, according to where a most-recent and most-accessible copy resides). The raw data is returned to the GPU by the processor system (or the chipset).

The GPU then compresses the raw data and writes resultant compressed data to an address range corresponding to a compressed representation of the frame buffer (or portion thereof) that may be mapped directly to a graphics buffer. Reads directed to the compressed representation receive compressed data (suitable for expansion by the GPU), while reads of the uncompressed representation receive decompressed data provided by the processor system (or the chipset) upon expanding appropriate portions of the compressed data from the graphics buffer. Thus the processor system (or the chipset) provides an appearance (or view) of an uncompressed frame buffer to devices other than the GPU. The uncompressed frame buffer view may be used by any combination of a relatively simple graphics device (such as a simple CRT controller not enabled for decompression), debugging operations, and software rendering functions, according to various embodiments.

In embodiments where bus utilization is to be minimized or the GPU simplified, processing may include the following. Compressed frame buffer data is requested by the GPU from the processor system (or the chipset) according to an address range corresponding to a compressed representation of the frame buffer. If the requested data is not already present in a graphics buffer, then the processor system (or the chipset) fetches appropriate raw (i.e. uncompressed) frame buffer data from memory. In this context, memory includes any combination of processor write buffers, first- and second-level caches, the buffer/mini-cache, and DRAM, according to where a most-recent and most-accessible copy resides.

The processor system (or chipset) then compresses the raw data, and writes the resultant compressed data into a graphics buffer. The compressed data requested by the GPU is then returned from the graphics buffer and is expanded (i.e. decompressed) by the GPU. Thus uncompressed data makes only a single trip across one bus, thereby reducing energy consumption and bandwidth utilization, and the processor system (or chipset) retains an ability to access uncompressed frame buffer data.

In some embodiments where the GPU performs compression and decompression, the processor system (or chipset) lacks direct access to an uncompressed frame buffer. The GPU therefore provides a virtual frame buffer, with a corresponding virtual frame buffer address range defined for access by devices other than the GPU, such as CPUs, video-mirroring peripherals, and other similar requesters seeking frame buffer data.

In some of the aforementioned compression/decompression embodiments, the graphics buffer is implemented as all or a portion of the buffer/mini-cache. In some embodiments the graphics buffer portion of the buffer/mini-cache is operated according to a first buffer/mini-cache management policy, while the remainder of the buffer/mini-cache is operated according to a second buffer/mini-cache management policy. For example, the first buffer management policy may include keeping the entire graphics buffer 'clean' (i.e. having no lines in a dirty state). Keeping the graphics buffer clean removes the necessity of flushing the graphics buffer, and in some designs writes to a frame buffer address range (distinct from the graphics buffer address range) are cached separately, such as in another portion of the buffer/mini-cache. In some usage scenarios the writes correspond to data from a video capture device (or card) directed to a video-in-a-window region. The video capture data is overwritten frequently and storing it in the buffer/mini-cache may greatly reduce DRAM accesses.

In some embodiments graphics buffering is provided by the buffer/mini-cache independently of the normal and the buffer modes as described with respect to FIG. 3. In other words, graphics buffering by the buffer/mini-cache is operative even when all the CPUs are operating in full-power and/or high-performance regimes, thus reducing DRAM accesses during normal CPU operation.

While the aforementioned description focuses on non-cacheable traffic sourced by a GPU, the description is equally applicable without limitation to non-cacheable traffic from any agent, such as any DMA device. For example, non-cacheable traffic from various DMA agents such as network controllers, storage interfaces, and other similar high-bandwidth I/O elements may be processed by the buffer/mini-cache according to various embodiments.

Processor-Included Buffer/Mini-Cache Embodiments

FIGS. 7A-7F illustrate various embodiments of and contexts associated with a processor-included buffer/mini-cache, as relating to all or portions of Processor Chip 102 of FIG. 1. The figures illustrate various arrangements of CPUs and associated cache sub-systems, including several combinations of L1, L2, and L3 cache structures. The figures further illustrate embodiments where the processor-included buffer/mini-cache is distinct from or combined with the cache sub-system.

Figure 7A:
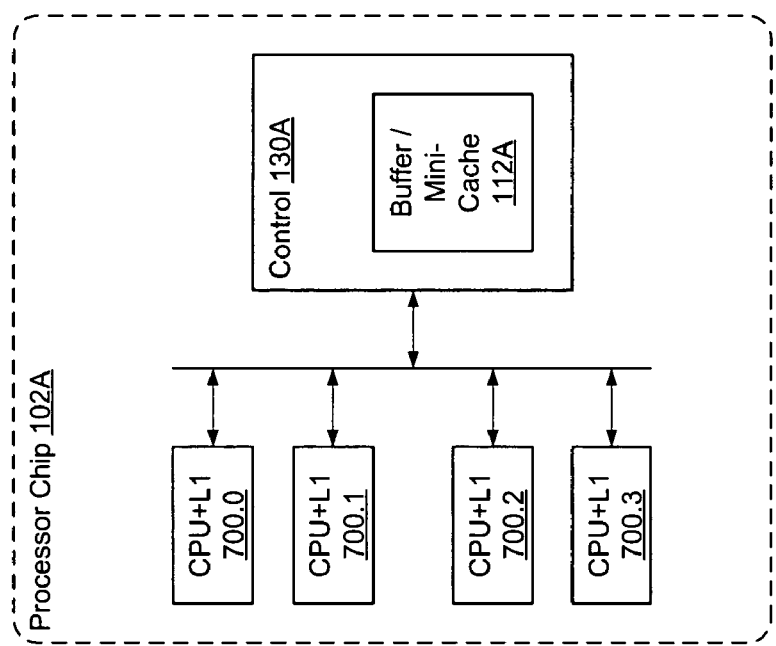
FIGS. 7A-7F illustrate various embodiment contexts of a processor-included buffer/mini-cache.

FIG. 7A illustrates a variation of Processor Chip 102 as Processor Chip 102A having four CPU and L1 units 700.0-3 coupled to Control unit 130A having processor-included Buffer/Mini-Cache 112A. Other elements may be included in the processor chip (such as a DRAM controller) but are omitted from the figure for clarity. The CPU and L1 units may individually include one or more CPUs and one or more L1 caches (such as instruction and data caches), according to various implementations. Although four CPU and L1 units are illustrated, those of ordinary skill in the art will recognize that more or fewer units may be used. In some embodiments each of the CPU and L1 units are identical, while in some embodiments one or more of the CPU and L1 units may be distinct (i.e. have a CPU or cache with greater or lesser power or performance characteristics). In some embodiments all or portions of the buffer/mini-cache are implemented in one or more of the CPU and L1 units.

Figure 7B:
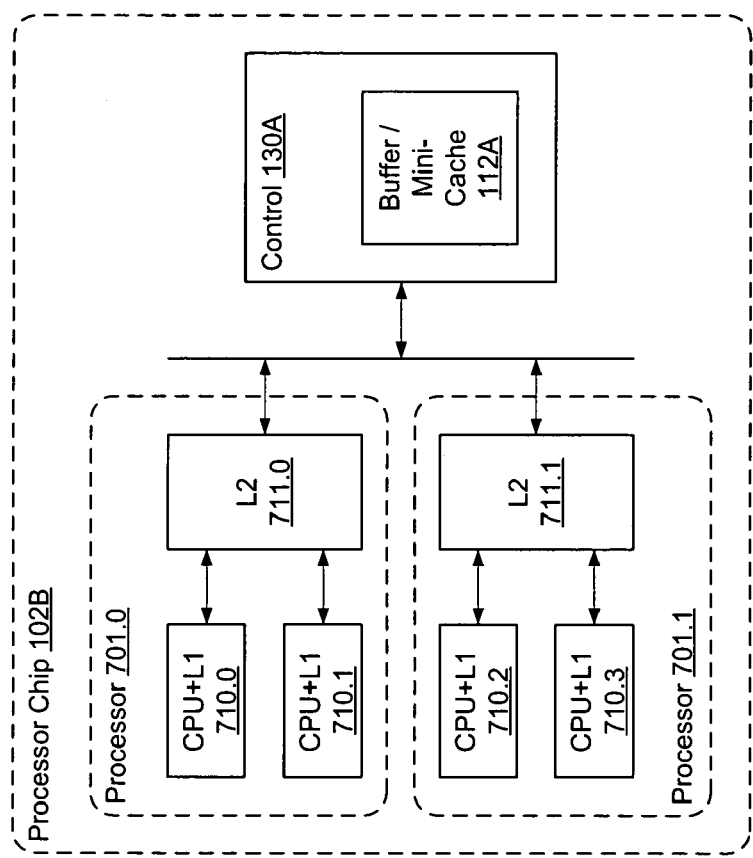

FIG. 7B illustrates a variation of Processor Chip 102 as Processor Chip 102B having a pair of Processors 701.0-1 coupled to Control unit 130A having processor-included Buffer/Mini-Cache 112A. Other elements may be included in the processor chip (such as a DRAM controller) but are omitted from the figure for clarity. As illustrated, each of the processors includes a pair of CPU and L1 units coupled to a shared L2 cache (such as Processor 701.0 having CPU and L1 units 710.0-1 and L2 711.0). The L2 caches are in turn coupled to the control unit to exchange data with the buffer/mini-cache. Although a pair of processors each having a pair of CPUs is illustrated, those of ordinary skill in the art will recognize that more or fewer CPUs may be used in each processor, and more or fewer processors may be used. In some embodiments each of the processors are identical, while in some embodiments one or more of the processors may be distinct (such as having more or fewer CPUs). In some embodiments each of the CPU and L1 units are identical, while in some embodiments one or more of the CPU and L1 units may be distinct (i.e. have a CPU or cache with greater or lesser power or performance characteristics).

Figure 7C:
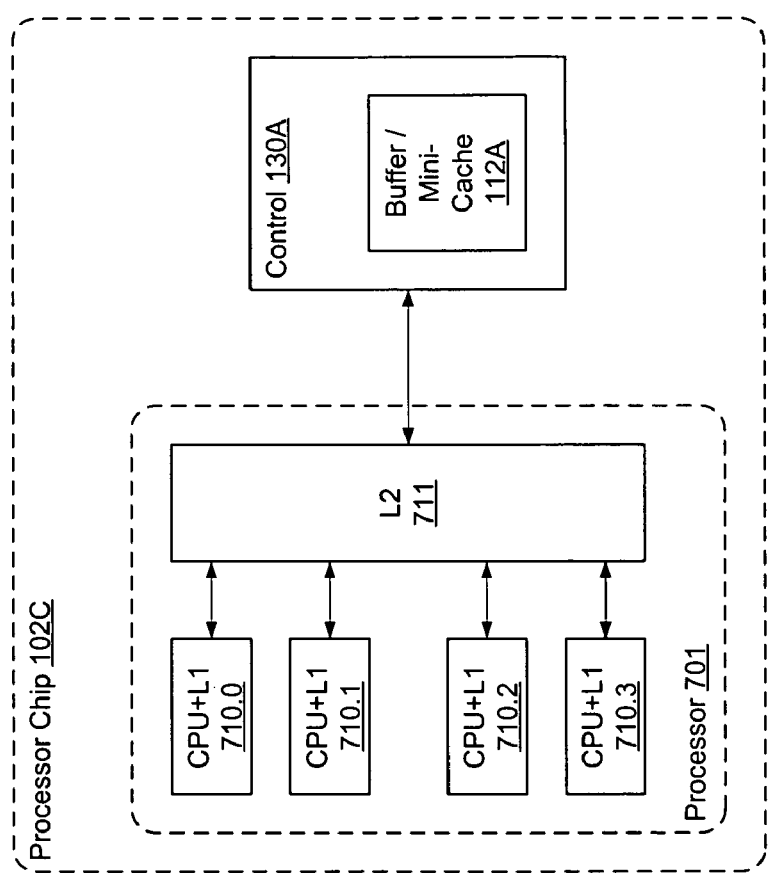

FIG. 7C illustrates a variation of Processor Chip 102 as Processor Chip 102C that is similar to Processor Chip 102B (of FIG. 7B), except the L2 cache resource is a single unit (L2 711) in single Processor 701. Other elements may be included in the processor chip (such as a DRAM controller) but are omitted from the figure for clarity. As in embodiments illustrated in FIGS. 7A and 7B, the number, arrangement, and characteristics of CPUs and L1s may vary according to embodiment.

Figure 7D:
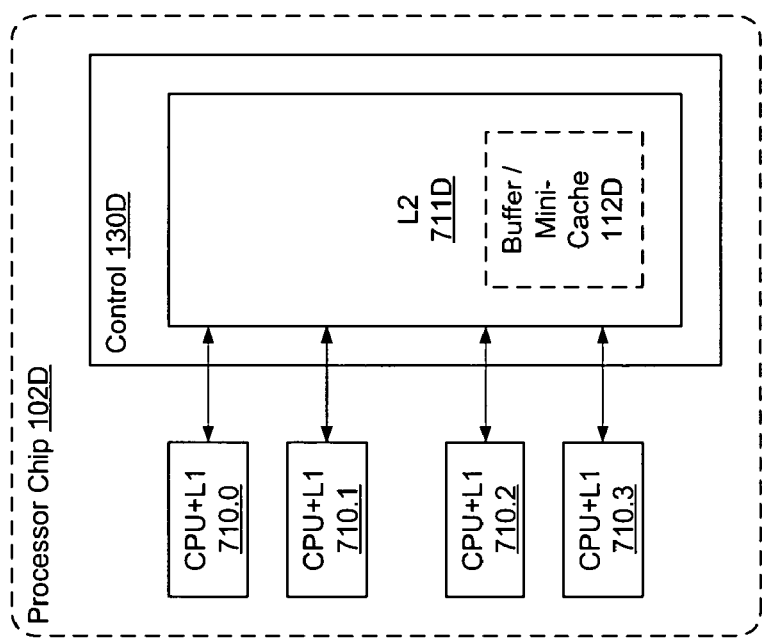

FIG. 7D illustrates a variation of Processor Chip 102 as Processor Chip 102D that is similar to Processor Chip 102 C (of FIG. 7C), except that the L2 and the buffer/mini-cache have been combined. Control unit 130D is similar to Control unit 130A except that it is adapted to manage Buffer/Mini-Cache 112D as implemented by inclusion in L2 711D, that is in turn similar to L2 711 except for inclusion of the buffer/mini-cache. In some embodiments the inclusion of the buffer/mini-cache is implemented by reserving a portion of the L2 for use as a buffer/mini-cache. The reserving may be according to a number or identification of ways in the L2, or any other similar mechanism (see the Reduction of DRAM Accesses by Non-Cacheable Accesses section elsewhere herein for more information). As in embodiments illustrated in FIGS. 7A-7C, other elements may be included in the processor chip, and the number, arrangement, and characteristics of CPUs and L1s may vary according to embodiment.

Figure 7E:
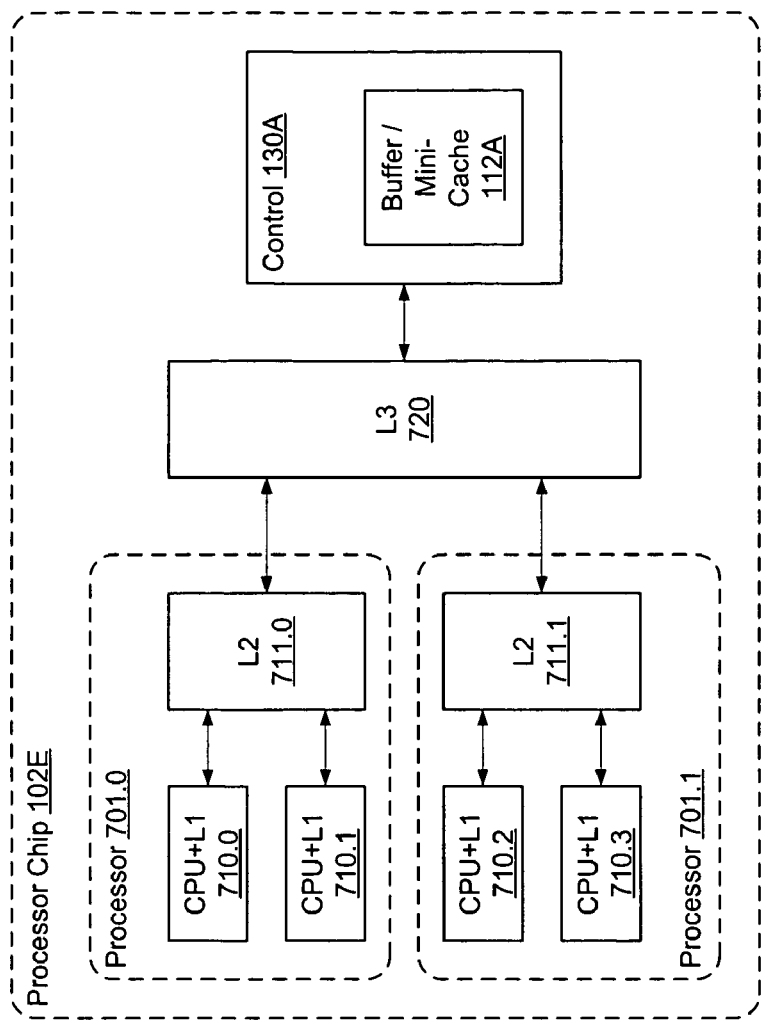

FIG. 7E illustrates a variation of Processor Chip 102 as Processor Chip 102E that is similar to Processor Chip 102B (of FIG. 7B), except that an additional layer of cache is inserted between the CPUs and the buffer/mini-cache as L3 720. As in embodiments illustrated in FIGS. 7A-7D, other elements may be included in the processor chip, and the number, arrangement, and characteristics of CPUs, L1s, and L2s may vary according to embodiment.

Figure 7F:
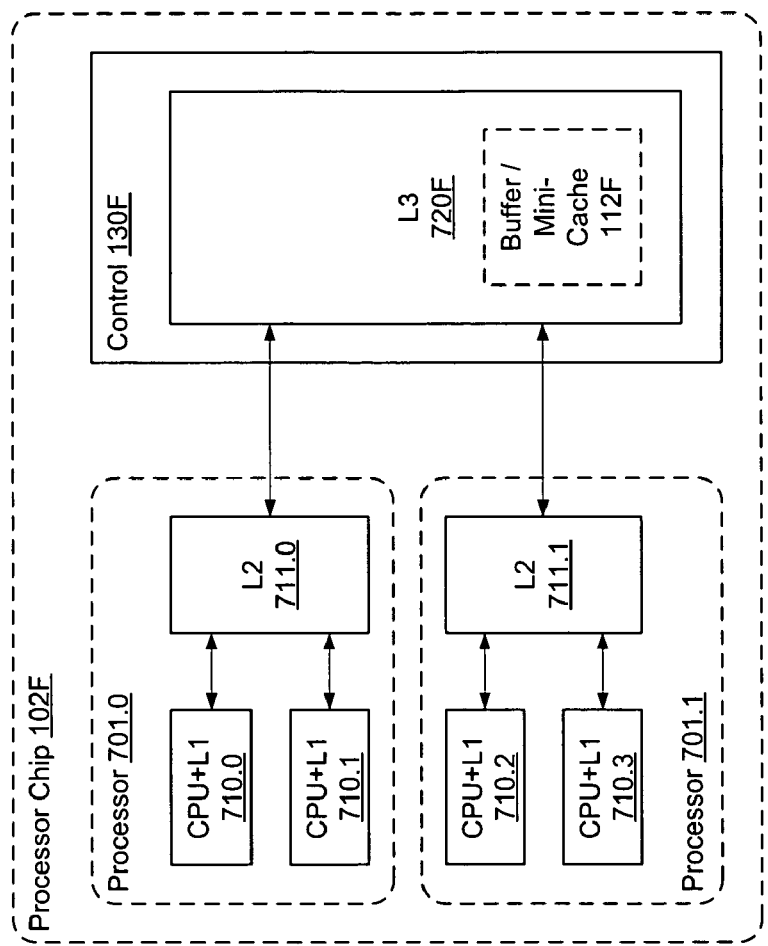

FIG. 7F illustrates a variation of Processor Chip 102 as Processor Chip 102 F that is similar to Processor Chip 102E (of FIG. 7E), except that the L3 and the buffer/mini-cache have been combined. Control unit 130F is similar to Control unit 130A except that it is adapted to manage Buffer/Mini-Cache 112F as implemented by inclusion in L3 720F, that is in turn similar to L3 720 except for inclusion of the buffer/mini-cache. Similar to embodiments illustrated by FIG. 7D, the inclusion of the buffer/mini-cache may be implemented by reserving a portion of the L3 for use as a buffer/mini-cache. The reserving may be according to a number or identification of ways in the L3, or any other similar mechanism (see the Reduction of DRAM Accesses by Non-Cacheable Accesses section elsewhere herein for more information).

CONCLUSION

Although the foregoing embodiments have been described in some detail for purposes of clarity of understanding, the invention is not limited to the details provided. There are many ways of implementing the invention. The disclosed embodiments are illustrative and not restrictive.

It will be understood that many variations in construction, arrangement and use are possible consistent with the teachings and within the scope of the claims appended to the issued patent. For example, interconnect and function-unit bit-widths, clock speeds, and the type of technology used may generally be varied in each component block. The names given to interconnect and logic are merely illustrative, and should not be construed as limiting the concepts taught. The order and arrangement of flowchart and flow diagram process, action, and function elements may generally be varied. Also, unless specifically stated to the contrary, the value ranges specified, the maximum and minimum values used, or other particular specifications (such as the number and type of non-cacheable references; the number and type of DMA devices; the number, capacity, and organization of the buffer/mini-caches; the number, width, and organization of fields in buffer/mini-cache structures and associated mode registers; and the number of entries or stages in registers and buffers), are merely those of the illustrative embodiments, may be expected to track improvements and changes in implementation technology, and should not be construed as limitations.

Functionally equivalent techniques known to those of ordinary skill in the art may be employed instead of those illustrated to implement various components, sub-systems, functions, operations, routines, and sub-routines. It is also understood that many design functional aspects may be carried out in either hardware (i.e., generally dedicated circuitry) or software (i.e., via some manner of programmed controller or processor), as a function of implementation dependent design constraints and the technology trends of faster processing (which facilitates migration of functions previously in hardware into software) and higher integration density (which facilitates migration of functions previously in software into hardware). Specific variations may include, but are not limited to: differences in partitioning; different form factors and configurations; use of different operating systems and other system software; use of different interface standards, network protocols, or communication links; and other variations to be expected when implementing the concepts taught herein in accordance with the unique engineering and business constraints of a particular application.

The embodiments have been illustrated with detail and environmental context well beyond that required for a minimal implementation of many of aspects of the concepts taught. Those of ordinary skill in the art will recognize that variations may omit disclosed components or features without altering the basic cooperation among the remaining elements. It is thus understood that much of the details disclosed are not required to implement various aspects of the concepts taught. To the extent that the remaining elements are distinguishable from the prior art, components and features that may be so omitted are not limiting on the concepts taught herein.

All such variations in design comprise insubstantial changes over the teachings conveyed by the illustrative embodiments. It is also understood that the concepts taught herein have broad applicability to other computing and networking applications, and are not limited to the particular application or industry of the illustrated embodiments. The invention is thus to be construed as including all possible modifications and variations encompassed within the scope of the claims appended to the issued patent.

What is claimed is:

1. A memory element including:
   a memory array; and
   a controller coupled to the memory array;
   wherein in response to a buffer-activation event, the controller directs the memory array to operate as a buffer responsive to a portion of a plurality of device accesses by a device and wherein in response to a cache-activation event, the controller directs the memory array to operate as a cache responsive to processor accesses by a processor;
   wherein the device is a graphics display processor and the device accesses include at least one non-cacheable read access and at least one non-cacheable write access.

2. The memory element of claim 1, wherein the controller is further configured, to flush the memory array upon detecting any of the events.

3. The memory element of claim 1, wherein the buffer-activation event includes at least one of:
   the instruction processor switching to a lower power state,
   the instruction processor switching to a lower performance state, and
   the instruction processor turning off snooping; wherein the cache-activation event includes at least one of:
   the instruction processor switching to a higher power state,
   the instruction processor switching to a higher performance state, and
   the instruction processor turning on snooping.

4. The memory element of claim 1, wherein the portion of the device accesses is determined in part by examination of a physical address associated with each respective one of the device accesses.

5. The memory element of claim 1, wherein the instruction processor is enabled to execute variable-length instructions and the processor accesses include at least one cacheable processor read access and at least one cacheable processor write access.

6. A system including:
   a storage array operable according to a cacheable-access mode responsive to cacheable accesses from an instruction processor and a non-cacheable-access mode responsive to a portion of a plurality of non-cacheable, buffered accesses from a device; and
   a storage controller;
   wherein the storage controller is enabled to recognize a cacheable-access-transition event and in response thereto to transition the storage array from the non-cacheable-access mode to the cacheable-access mode, wherein the cacheable-access-transition event includes at least one of:
   the instruction processor switching to a higher power state,
   the instruction processor switching to a higher performance state, and
   the instruction processor turning on snooping;
   wherein the non-cacheable-access-transition event includes at least one of:
   the instruction processor switching to a lower power state;
   the instruction processor switching to a lower performance state, and
   the instruction processor turning off snooping; and
   wherein the portion of the non-cacheable accesses is determined based at least in part on respective physical addresses associated with each of the non-cacheable accesses.

7. The system of claim 6, wherein the storage controller is further enabled to recognize a non-cacheable-access-transition event and in response thereto to transition the storage array from the cacheable-access mode to the non-cacheable-access mode.

8. The system of claim 6, wherein the storage controller is further enabled to direct a flush of the storage array during the transition from the cacheable-access mode to the non-cacheable-access mode.

9. The system of claim 6, wherein the storage controller is further enabled to direct a flush of the storage array during the transition from the non-cacheable-access mode to the cacheable-access mode.

10. The system of claim 6, further including the instruction processor.

11. The system of claim 6, further including the device.

12. The system of claim 11, wherein the device is a graphics display processor.

13. The system of claim 12, wherein the graphics display processor is enabled to generate some of the non-cacheable accesses.

14. The system of claim 12, wherein the graphics display processor is enabled to generate at least one of the non-cacheable accesses, and the at least one of the non-cacheable accesses is satisfied by data from the storage array.

15. The system of claim 12, wherein the graphics display processor is enabled to generate at least one of the non-cacheable accesses, and the at least one of the non-cacheable accesses is allocated to one of a plurality of lines implemented by the storage array.

16. The system of claim 12, further including a Dynamic Random Access Memory (DRAM) controller coupled to a DRAM and response to at least one of the non-cacheable accesses that is distinct from the portion of the non-cacheable accesses.

17. The system of claim 6, wherein the storage array is implemented in an outer-level cache associated with the instruction processor.

18. The system of claim 6, wherein a portion of the storage array is operable according to the non-cacheable-access mode, and the portion is determined in part based on an allocation of one or more ways of the outer-level cache.

19. A method, comprising:
    detecting, while operating a storage structure according to a non-cacheable mode, a transition-to-cacheable-mode event;
    flushing, in response to the detecting of the transition-to-cacheable-mode event, the storage structure, while operating the storage structure according to a cacheable mode, detecting a transition-to-non-cacheable-mode event; and flushing, in response to the detecting of the transition-to-non-cacheable-mode event, the storage structure;

searching, while operating the storage structure according to the non-cacheable mode, the storage structure for data responsive to a non-cacheable access from a device, the non-cacheable access having a physical address between a strating physical address and an ending physical address; and responding, while operating the storage structure according to the cacheable mode, to cacheable accesses from an instruction processor.

20. The method of claim 19, wherein the transition-to-cacheable-mode event includes at least one of:

the instruction processor switching to a higher power state;

the instruction processor switching to a higher performance state; or the instruction processor turning on snooping; and wherein the transition-to-non-cacheable-mode event includes at least one of:

the instruction processor switching to a lower power state, the instruction processor switching to a lower performance state; or the instruction processor turning off snooping.

21. The method of claim 19, further including marking lines of the storage structure allocated during operation in the cacheable mode as distinct from lines of the storage structure allocated during operation in the non-cacheable mode.

22. The method of claim 21, wherein the flushing is dependent upon the marking of the lines of storage.

23. The method of claim 19, wherein the device is a graphics display processor.

24. The method of claim 23, further including the graphics display processor storing compressed data in the storage structure.

25. The method of claim 24, further including the instruction processor receiving an uncompressed representation of at least a portion of the compressed data.

* * * * *